(12) United States Patent
Eustace

(10) Patent No.: US 11,715,857 B2
(45) Date of Patent: Aug. 1, 2023

(54) METHODS AND SYSTEMS FOR PROTECTING COMPONENTS OF DEEP WATER PRESSURE VESSELS

(71) Applicant: Aqua Satellite, Inc., Menlo Park, CA (US)

(72) Inventor: Robert Alan Eustace, Menlo Park, CA (US)

(73) Assignee: Aqua Satellite, Inc., Menlo Park, CA (US)

(*) Notice: Subject to any disclaimer, the term of this patent is extended or adjusted under 35 U.S.C. 154(b) by 192 days.

(21) Appl. No.: 17/344,416

(22) Filed: Jun. 10, 2021

(65) Prior Publication Data

US 2022/0021061 A1 Jan. 20, 2022

Related U.S. Application Data

(60) Provisional application No. 63/054,063, filed on Jul. 20, 2020.

(51) Int. Cl.
*B63C 11/52* (2006.01)
*H01M 50/24* (2021.01)
*H01M 50/242* (2021.01)
*H01M 50/186* (2021.01)

(52) U.S. Cl.
CPC ......... *H01M 50/24* (2021.01); *H01M 50/186* (2021.01); *H01M 50/242* (2021.01); *B63C 11/52* (2013.01)

(58) Field of Classification Search
CPC ....... B63B 3/13; H01M 50/24; H01M 50/186; H01M 50/242; B63C 11/52; B63C 8/001
See application file for complete search history.

(56) References Cited

U.S. PATENT DOCUMENTS

| | | | | |
|---|---|---|---|---|
| 3,523,216 A * | 8/1970 | Godwin, Jr. | ........... | H02G 15/14 361/736 |
| 3,791,875 A * | 2/1974 | Koehler | ................ | H01M 50/24 206/811 |
| 4,992,999 A * | 2/1991 | Yerby | .................... | B63G 8/001 367/106 |
| 6,278,658 B1 * | 8/2001 | Skinner | .................. | G10K 9/121 367/160 |
| 6,590,158 B1 * | 7/2003 | Schilling | ................ | H05K 5/068 361/752 |
| 6,643,222 B2 * | 11/2003 | Osborn | .................. | H04R 17/00 367/141 |
| 9,735,496 B1 * | 8/2017 | Arimai | ................. | H01R 13/665 |
| 2003/0048618 A1 * | 3/2003 | Adams, Sr. | ........ | H05K 7/20445 361/740 |

(Continued)

*Primary Examiner* — Imran Akram
(74) *Attorney, Agent, or Firm* — Kilpatrick Townsend & Stockton LLP

(57) ABSTRACT

Embodiments include enclosures for protecting electronics such as circuit board and battery assemblies in high-pressure environments. Customized pressure distribution structures are positioned around the electronics. The pressure distribution structures include cavities that are sized to distribute pressure across the electronics in a predetermined manner based on known pressure tolerances of components or portions of the electronics. The pressure distribution structures may include various features such as vias for enhancing thermal conductivity. The enclosure may be sealed and surrounded by an envelope. Methods for manufacturing such enclosures are disclosed.

13 Claims, 19 Drawing Sheets

(56) References Cited

U.S. PATENT DOCUMENTS

| | | | | |
|---|---|---|---|---|
| 2005/0174727 A1* | 8/2005 | Thomas | ................ | G06F 1/1626 |
| | | | | 361/679.56 |
| 2011/0088609 A1* | 4/2011 | Vosburgh | ............... | B63G 8/001 |
| | | | | 114/321 |
| 2014/0360590 A1* | 12/2014 | Bertoldi | ................ | F16K 17/048 |
| | | | | 137/15.18 |
| 2015/0110989 A1* | 4/2015 | Radivojevic | ........ | H01M 50/224 |
| | | | | 428/69 |
| 2016/0004283 A1* | 1/2016 | Ganguly | ................ | G06F 1/182 |
| | | | | 307/118 |
| 2016/0237575 A1* | 8/2016 | Murray | ................... | C23F 13/18 |
| 2017/0191651 A1* | 7/2017 | Merewether | .......... | F21V 31/005 |
| 2019/0009870 A1* | 1/2019 | Williams | ................ | B63B 73/20 |
| 2019/0100294 A1* | 4/2019 | Xiong | ..................... | B63C 11/52 |
| 2019/0305277 A1* | 10/2019 | Wang | .................. | H01M 50/103 |
| 2019/0386271 A1* | 12/2019 | Ogawa | ................ | H01M 50/394 |

\* cited by examiner

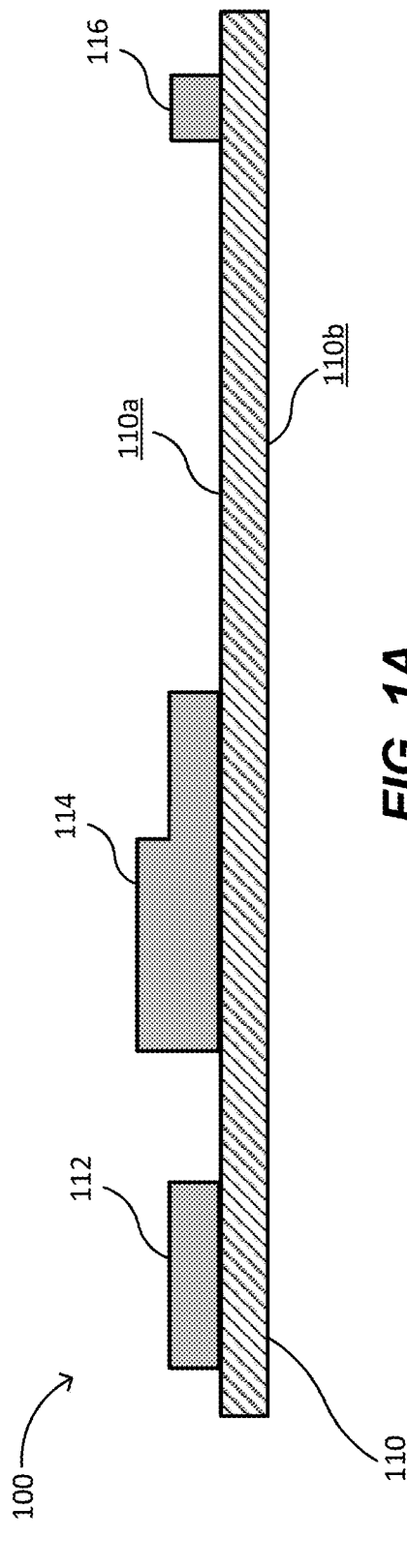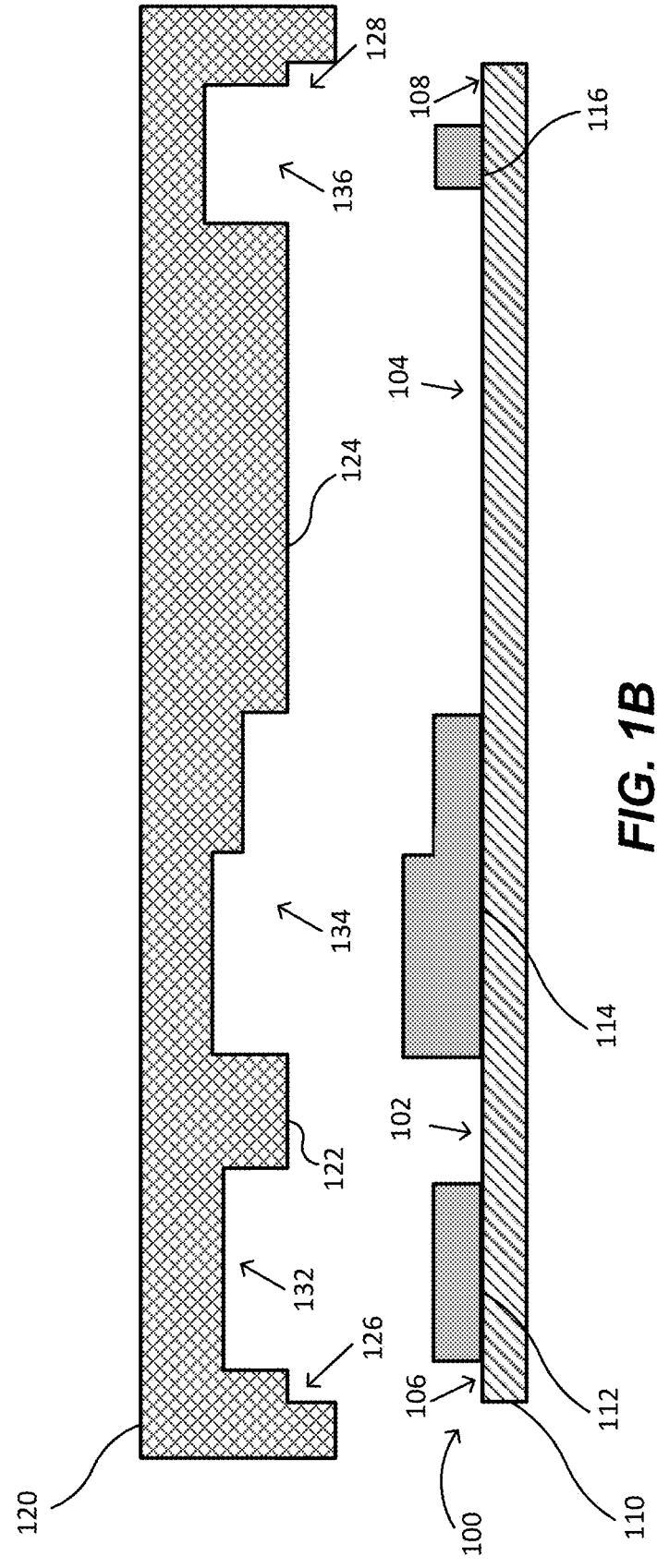

METHODS AND SYSTEMS FOR PROTECTING COMPONENTS OF DEEP WATER PRESSURE VESSELS

CROSS-REFERENCE TO RELATED APPLICATION

This application claims priority to and the benefit of U.S. Provisional Patent Application No. 63/054,063, filed Jul. 20, 2020, which is hereby incorporated by reference in its entirety for all purposes.

BACKGROUND OF THE INVENTION

The pressure at the bottom of the ocean can be as high as 15,750 pounds per square inch (psi). As a result of the engineering challenges associated with design in this regime, deep bodies of water like the ocean remains largely unexplored. Deep-sea exploration has utilized a variety of technologies, including sonar, which can detect the presence of objects underwater through the use of sound, and deep-diving submersibles.

Despite the progress made in the area of ocean exploration, methods and systems are needed for protecting components of deep water vessels.

SUMMARY OF THE INVENTION

This disclosure presents a novel approach to provide a cheap and efficient way to allow standard, off-the-shelf electronics to operate in high pressure environments. In particular, the disclosure describes a number of embodiments related to enclosures for protecting electronic components in high-pressure environments. Although some embodiments are related to protecting electrical components in deep-water applications, it is to be understood that the methods and systems described here may be employed in protecting any suitable components in any suitable application where high pressures are involved.

Embodiments of the present disclosure include a circuit board assembly enclosure for providing a predetermined pressure distribution. The enclosure may include a circuit board assembly including a circuit board having a first surface and a second surface, the circuit board assembly including one or more circuit components mounted on the first surface; and a first pressure distribution structure positioned over the circuit board assembly. The first pressure distribution structure may include one or more areas conforming to one or more corresponding sections of the first surface, and one or more cavities, each cavity configured to receive one of the one or more circuit components, the one or more cavities including a first cavity having a first volume larger than a volume of a corresponding first circuit component of the one or more circuit components so as to create a first gap between the first pressure distribution structure and the first circuit component when the enclosure is at sea level.

In some embodiments, the one or more cavities further include a second cavity, and wherein the one or more circuit components further includes a corresponding second circuit component, the second cavity having a second volume that is approximately the same as a volume of the corresponding second circuit component. In some embodiments, the one or more cavities further include a third cavity, and wherein the one or more circuit components further includes a corresponding third circuit component, the third cavity having a third volume larger than a volume of a corresponding third circuit component so as to create a third gap between the first pressure distribution structure and the third circuit component. A distance between the first pressure distribution structure and the third circuit component across the third gap may be larger than a distance between the first pressure distribution structure and the first circuit component across the first gap such that the first circuit component is exposed to more pressure than the third circuit component when the enclosure is exposed to a high-pressure environment at a particular pressure level above a threshold.

In some embodiments, the second surface includes one or more second-surface circuit components, the enclosure further including a second pressure distribution structure having one or more cavities corresponding to the one or more second-surface circuit components. In some embodiments, the enclosure may further include an additional circuit board assembly having one or more additional circuit components mounted on a surface of the additional circuit board assembly; and an additional pressure distribution structure having one or more cavities corresponding to the one or more additional circuit components. In some embodiments, the first pressure distribution structure and the second pressure distribution structure form a single integral structure.

In some embodiments, the first gap includes an air gap. In some embodiments, the enclosure further includes a pressure distributing layer disposed within the first gap, wherein the pressure distributing layer includes a polymer material. In some embodiments, the polymer material includes a rubber material. In some embodiments, the pressure distributing layer is disposed over a top surface of the first circuit component.

In some embodiments, the first pressure distribution structure includes a fiberglass composite material. In some embodiments, the fiberglass composite material includes FR-4. In some embodiments, the enclosure further includes an envelope surrounding the circuit board assembly and the first pressure distribution structure. In some embodiments, the envelope includes a plastic material. In some embodiments, the enclosure further includes a sealing layer including a fabric material, wherein the envelope overlays the sealing layer. In some embodiments, the sealing layer includes an adhesive tape including a woven fabric.

In some embodiments, the enclosure further includes a first thermally conductive layer coupled to the first surface or the second surface, wherein the first thermally conductive layer is configured to receive heat from the circuit board assembly; a second thermally conductive layer coupled to an outer surface of the first pressure distribution structure; and a via disposed in between the first thermally conductive layer and the second thermally conductive layer, wherein the via is configured to conduct heat from the first thermally conductive layer to the second thermally conductive layer. In some embodiments, the enclosures capable of withstanding 15,750 pounds per square inch.

Some embodiments of the present disclosure relates to a battery enclosure for providing a predetermined pressure distribution. The enclosure may include a first battery having a first end, a middle portion, and a second end; a connector element configured to electrically couple the first battery to circuitry; a pressure distribution structure surrounding at least a portion of the first battery, wherein the pressure distribution structure includes a first cavity having a first volume larger than a volume of the first battery so as to create a first gap between the pressure distribution structure and the first battery. In some embodiments, a gap distance of the first gap varies along a length of the first gap, the gap distance being larger at the middle portion of the first battery than at the first end.

In some embodiments, the gap distance of the first gap varies incrementally along the length of the first gap. In some embodiments, the enclosure further includes a carbon fiber material wrapping at least a portion of the first battery.

In some embodiments, the enclosure further includes a second battery coupled to the first battery; and a pressure-absorbing structure sandwiched in between at least a portion of the first battery and at least a portion of the second battery. In some embodiments, the pressure-absorbing structure is formed to contact the first end of the first battery and an end of the second battery, the pressure-absorbing structure including an aperture configured to accommodate a protrusion of a terminal from the first end of the first battery. In some embodiments, the pressure-absorbing structure is dimensioned to extend radially outward beyond an outer perimeter of the first battery and an outer perimeter of the second battery. In some embodiments, the first battery is a D-cell battery.

Embodiments of the present disclosure include methods for manufacturing a custom enclosure structure for distributing pressure in a predetermined manner across a circuit board assembly including one or more circuit components mounted on a first surface of the circuit board assembly. The method may include receiving a three-dimensional scan of the circuit board assembly, the three-dimensional scan including an image representation of a first side of the circuit board assembly corresponding to the first surface and an image representation of a second side of the circuit board assembly corresponding to a second surface of the circuit board assembly; generating an initial three-dimensional model including an image representation of an inverse of the first side of the circuit board assembly, the initial three-dimensional model including an image representation of one or more cavities corresponding to the circuit components mounted on the first surface; determining pressure tolerance values for one or more of the one or more circuit components; and based on the determined pressure tolerance values of a first circuit component of the one or more circuit components, increasing a volume of a corresponding first cavity to generate a final three-dimensional model. In some embodiments, the method may include adding a volume to the initial three-dimensional model directly above the first cavity so as to reduce a risk of collapse under a desired pressure.

In some embodiments, the method may include receiving an image of the circuit board assembly; identifying the one or more circuit components; and accessing a lookup table that associates known circuit components with associated pressure tolerance values; and determining, for each of the one or more circuit components, an associated pressure tolerance value based on the lookup table. In some embodiments, the image of the circuit board assembly includes a two-dimensional photograph. In some embodiments, the image of the circuit board assembly includes a schematic diagram of the circuit board assembly.

Embodiments of the present disclosure include methods for manufacturing a custom enclosure structure for distributing pressure in a predetermined manner across a battery assembly. The method may include receiving a three-dimensional scan of the circuit board assembly, the three-dimensional scan including an image representation of a first side of the circuit board assembly corresponding to the first surface and an image representation of a second side of the circuit board assembly corresponding to a second surface of the circuit board assembly; generating an initial three-dimensional model including an image representation of an inverse of the first side of the circuit board assembly, the initial three-dimensional model including an image representation of one or more cavities corresponding to the circuit components mounted on the first surface; determining pressure tolerance values for one or more of the one or more circuit components; and based on the determined pressure tolerance values of a first circuit component of the one or more circuit components, increasing a volume of a corresponding first cavity to generate a final three-dimensional model.

Embodiments of the present disclosure include an enclosure structure for distributing pressure in a predetermined manner across a circuit board assembly. The enclosure structure may include a first pressure distribution structure configured to be positioned over the circuit board assembly. The first pressure distribution structure may include one or more areas configured to conform to one or more corresponding sections of a first surface of the circuit board assembly, and one or more cavities, each cavity configured to receive one or more circuit components of the circuit board assembly, the one or more cavities including a first cavity having a first volume larger than a volume of a corresponding first circuit component of the one or more circuit components so as to create a first gap between the first pressure distribution structure and the first circuit component.

Embodiments of the present disclosure include methods of manufacturing a custom pressure distribution structure for distributing pressure in a predetermined manner across a first side of a circuit board assembly including one or more circuit components mounted on a first surface of the circuit board assembly. The method may include determining pressure tolerance values for one or more of the one or more circuit components; disposing one or more volume-increasing elements over one or more of the circuit components, wherein each of the volume-increasing elements has a respective thickness based on the determined pressure tolerance values, and wherein each volume-increasing element increases a height of corresponding portions of the first side of the circuit board assembly by an amount corresponding to the thickness of the volume-increasing element; actuating a probe across the first side of the circuit board assembly along a first plane parallel to the first side of the circuit board assembly, wherein the probe is configured to move perpendicularly with respect to the first plane based on a height of the first side of the circuit board assembly proximate to a distal end of the probe; and actuating a router element across a corresponding first side of a pressure distribution article along a second plane parallel to the first side of the pressure distribution structure, wherein the router element is configured to move perpendicularly with respect to the second plane in accordance with the perpendicular movements of the probe, and wherein the router element is configured to cut into the first side of the pressure distribution structure.

In some embodiments, a first pressure tolerance value is determined for a first circuit component and a second pressure tolerance value is determined for a second circuit component, the second pressure tolerance value being greater than the first pressure tolerance value; and a thickness of a first volume-increasing element disposed over the first circuit component is less than a thickness of a second volume-increasing element disposed over the second circuit component.

In some embodiments, the first plane and the second plane are parallel. In some embodiments, the method may further include disposing the circuit board assembly on a horizontal surface, wherein the perpendicular movements of the probe and the router element are vertical movements with respect to the horizontal surface. In some embodiments, the probe and the router element are mechanically coupled to cause the router element to move with the probe.

Numerous benefits are achieved by way of the present disclosure over conventional techniques. For example, embodiments of the present disclosure provide enclosures that distribute pressure across electronics such as circuit board assemblies and batteries, so as to allow these electronics to function in high-pressure environments (e.g., for deep-water exploration or similar applications). As explained in the disclosure, the enclosure may, for example, be designed such that pressure is distributed to components or areas based on their respective relative pressure tolerances. These and other embodiments of the disclosure, along with many their advantages and features, are described in more detail in conjunction with the text below and attached figures.

BRIEF DESCRIPTION OF THE DRAWINGS

FIG. 1A is a simplified, cross-sectional schematic diagram of a circuit board assembly.

FIG. 1B is a simplified, cross-sectional schematic diagram of an example pressure distribution structure that may be designed to be positioned over the circuit board assembly according to an embodiment of the present invention.

DETAILED DESCRIPTION OF SPECIFIC EMBODIMENTS

Figure 2A:
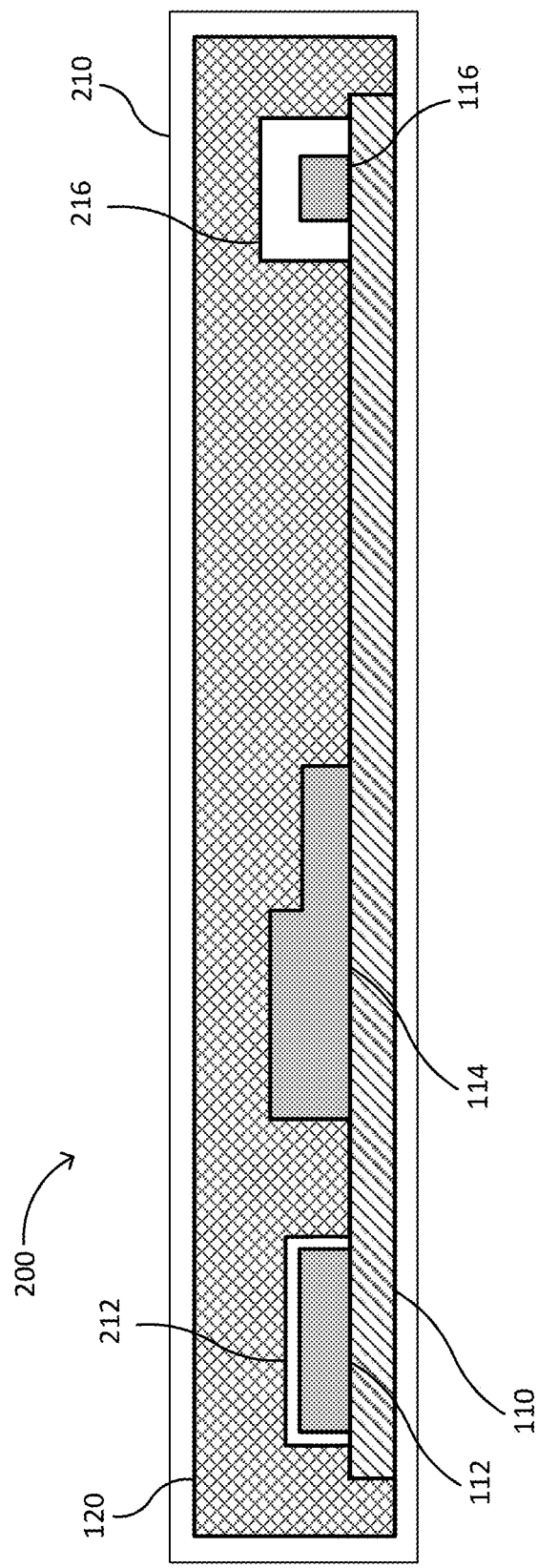
FIG. 2A is a simplified, cross-sectional schematic diagram of an example circuit board assembly enclosure under a relatively low pressure (e.g., mean sea level pressure), where the example pressure distribution structure is positioned over the example circuit board assembly according to an embodiment of the present invention.

The present disclosure describes a number of embodiments related to enclosures for protecting electronic components in high-pressure environments. For example, the enclosures may be used to protect electronic components such as circuit board assemblies and batteries of deep water vehicles when they experience extremely high pressures (e.g., 15,750 pounds per square inch (psi), or about 108,592 kilopascals) near the ocean floor.

To date, operating machinery in any deep body of water is an extremely expensive endeavor. In the high-pressure environment associated with deep-water applications, components of any deep-water vessel experience tremendous compressive forces that would damage any ordinary electronics if not protected. The conventional solution involves specially designing circuit board assemblies, batteries, and other components and placing them in large, heavy, bulky metal containers to shield the components. This approach greatly contributes to the expense of any deep water operation. A cheap and efficient way to allow even standard, off-the-shelf electronics to operate in high pressure environments would open a new chapter in deep water exploration, searching, and research. It would make forays into deep water much more feasible for companies, or even individuals, to undertake.

The standard approach to designing deep water vessels is to separate the components of the vessels into two groups, with one group including all the components that can naturally survive high pressures. These items are typically made out of steel or titanium, and are very strong. The second group of items are things that cannot survive under these pressures, such as the electronics needed for guidance and control for the vessel. These items are generally operated at roughly 1 atmosphere of pressure (around 14.7 psi) to function optimally, and are generally specially protected from high pressure.

The primary solution to this problem is to measure the size of the component that needs to be protected from the high pressure, and encapsulate it in a strong container (typically aluminum, steel, or titanium). The most efficient structure for such a container to sustain very high pressures is the sphere, and they are used in some deep water applications. Spheres are hard to manufacture, so the next best structure is the cylinder.

There are many problems with this approach. Such containers are big, heavy, expensive, and place constraints on the shape of the vessel. For example, cylindrical containers would dictate an elongated vessel shape similar to a torpedo, which is not efficient, for example, in reducing drag forces. In addition, many underwater applications place a strong preference on vessels that have neutral (or close to neutral) buoyancy to allow for efficient transport. In such cases, every pound of metal needs to be offset by multiple times that amount in ballast, which takes up valuable space. This ballast is usually composed on syntactic foam, which is very expensive, difficult to manufacture, and difficult to maintain the same level of buoyancy under extreme pressures. Also, many of the components that need to be protected may not be shaped like the inside of a cylinder or sphere, thereby resulting in inefficiencies in the utilization of space, further increasing vessel size. Conventional design approaches attempt to maximize utilization of this space by putting as many irregular items as possible into the cylinder or sphere, which could lead to overheating as the irregular items obstruct the conduction or convection of heat. Large vehicles need large propulsion systems, which utilize large batteries, thereby making the vehicle even larger, heavier, and more expensive.

Finally, in these conventional approaches, the components themselves may need to be specially designed to fit the specifications of the container. For example, off-the-shelf circuit board assemblies and components may not be optimal, and special circuit board assemblies may need to be designed and manufactured. This can add significant expense to the vessel. As another example, conventional approaches may need to employ relatively expensive lithium-ion polymer batteries rather than the standard, off-the-shelf batteries that are used for more conventional electronics.

FIG. 1A is a simplified, cross-sectional schematic diagram of a circuit board assembly 100. In some embodiments, a circuit board assembly enclosure may be used to distribute pressure across the circuit board assembly in a predetermined manner (e.g., such that pressure distribution is optimized to enhance the ability of various components of the circuit board assembly to withstand high pressures). Such distribution may include constructing the enclosure such that different areas of the circuit board assembly experience different levels of pressure. For example, a total pressure that is experienced by the enclosure may be distributed to different areas differently based on pressure tolerances of the different areas. In some embodiments, the enclosure may include a circuit board assembly including a circuit board having a first surface and a second surface. For example, referencing FIG. 1A, the circuit board assembly 100 may include a circuit board 110 having a first surface 110a and a second surface 110b. The circuit board assembly may include one or more circuit components mounted on the first surface. For example, referencing FIG. 1A, the circuit components 112, 114, and 116 may be mounted on the first surface 110a. The circuit board assembly may be said to have a first side that includes the first surface 110a and any circuit components mounted thereon, and a second side that includes the second surface 110b and any circuit components mounted thereon.

FIG. 1B is a simplified, cross-sectional schematic diagram of an example pressure distribution structure 120 that may be designed to be positioned over the circuit board assembly 100 according to an embodiment of the present invention. In some embodiments, a pressure distribution structure is positioned over the circuit board assembly so as to absorb and/or distribute pressure across the circuit board assembly in a predetermined manner. The pressure distribution structure may include one or more portions that conform to one or more corresponding sections of the first surface. For example, referencing FIG. 1B, the portions 122, 124, 126, and 128 of the pressure distribution structure 120 are configured to conform to the sections 102, 104, 106, and 108, respectively, of the first surface 110a of the circuit board 110. These portions are configured such that when the enclosure is assembled, the portions 122, 124, 126, and 128 come in contact with the sections 102, 104, 106, and 108, respectively. The sections 102, 104, 106, and 108 may be sections that do not have circuit components that appreciably project outward from the circuit board 110. As illustrated, in some embodiments, the portions 122, 124, 126, and 128 may be protrusions that extend downward toward the first surface 110a of the circuit board when positioned appropriately for assembly, forming a surface that is parallel to the sections 102, 104, 106, and 108 when assembled.

In some embodiments, the pressure distribution structure 120 may be composed of the same or similar material as the circuit board of the circuit board assembly. For example, a pressure distribution structure may be composed of a material including FR-4 (flame retardant 4), which is a glass-reinforced epoxy laminate material that may be made of woven fiberglass cloth with an epoxy resin binder. FR-4 is a high-strength, durable material that can endure extremely high pressures without failing, and can endure large degrees of compression and high shear stress. Furthermore, FR-4 is electrically insulating (which is utilized to prevent electrical shorts) but thermally conductive. This thermal conductivity may be beneficial for electronics encased in a sealed enclosure (particularly in a tight enclosure), where generated heat (e.g., released from on-board processors) may become trapped. In some embodiments, the pressure distribution structure may be composed of any other suitable material, which may or may not be the same material as the circuit board. In some embodiments, the pressure distribution structure may include a metal layer (e.g., as an outer layer), or may be made entirely of metal (e.g., aluminum, steel, titanium).

In some embodiments, the pressure distribution structure may include one or more cavities configured to receive one of the one or more circuit components. For example, referencing FIG. 1B, the pressure distribution structure 120 includes the cavities 132, 134, and 136, which are configured to receive the circuit components 112, 114, and 116, respectively.

FIG. 2A illustrates a simplified, cross-sectional schematic diagram of an example circuit board assembly enclosure 200 under a relatively low pressure (e.g., mean sea level pressure) according to an embodiment of the present invention. The example pressure distribution structure 120 is positioned over the example circuit board assembly 100 in this embodiment. In some embodiments, the one or more cavities formed in the pressure distribution structure may include a first cavity having a first volume larger than a volume of a corresponding first circuit component of the one or more circuit components. This creates a first gap between the pressure distribution structure and the first circuit component. For example, referencing FIG. 2A, the cavity (the cavity 132 illustrated in FIG. 1B) corresponding to the circuit component 112 has a volume larger than the circuit component 112 such that the gap 212 between the pressure distribution structure 120 and the circuit component 112 is created. The gap created by the cavity may be of any suitable shape or size. For example, the gap 212 may be created such that the distance between the pressure distribution structure 120 and the circuit component 112 is approximately equal around the entire circuit component 112 (e.g., such that the gap 212 is roughly the same shape as the circuit component 112). As illustrated in the example of FIG. 2A, once the pressure distribution structure 120 is appropriately positioned over the circuit board assembly 100, the portions 122, 124, 126, and 128 (referencing FIG. 1A) mate with the sections 102, 104, 106, and 108 (again referencing FIG. 1A), respectively.

The gap created by a cavity corresponding to a particular circuit component is significant in that it affects the amount of pressure experienced by the particular circuit component when the enclosure is placed under pressure (e.g., when the enclosure is brought near the high-pressure environment of the ocean floor). As such, the gap size may be controlled to distribute pressure across the circuit components of the circuit board assembly as needed based on the pressure tolerances of the circuit components. Generally, the gap size may be increased or decreased based on pressure tolerances of the associated circuit component. For example, a circuit component that has a relatively high pressure tolerance (e.g., a circuit component that is able to withstand and/or function optimally under relatively high pressure) may utilize a relatively small (or no) gap, while a circuit component that has a relatively low pressure tolerance (e.g. a circuit component that cannot withstand or function optimally under relatively high pressure) may utilize a relatively large gap. Essentially, providing a larger gap around a particular circuit component causes less pressure to be transferred to the particular circuit component, as will be explained further below with respect to FIG. 2B.

In some embodiments, the pressure distribution structure may include a second cavity corresponding to a second circuit component of the circuit board assembly. This second cavity may have a second volume that is approximately the same as a volume of the corresponding second circuit component. For example, referencing FIG. 2A, the cavity 134 illustrated in FIG. 1B corresponding to the circuit component 114 has a volume that is approximately the same as a volume of the circuit component 114 such that there is no appreciable gap between the pressure distribution structure 120 and the circuit component 114. In this example, as explained above, the circuit component 114 may have a relatively high pressure tolerance, and as such, may not utilize a gap.

In some embodiments, the pressure distribution structure may include a third cavity corresponding to a third circuit component of the circuit board assembly. This third cavity may have a third volume that is larger than a volume of a corresponding third circuit component so as to create a third gap 216 between the pressure distribution structure and the third circuit component. In some embodiments, the distance between the pressure distribution structure and the third circuit component across the third gap 216 may be larger than a distance between the pressure distribution structure and the first circuit component across the gap 212. Such a configuration may cause the first circuit component to be exposed to more pressure than the third circuit component when the enclosure is exposed to a high-pressure environment at a particular pressure level above a threshold (e.g., 7,000 psi; 10,000 psi; 15,000 psi; 15,750 psi). For example, referencing FIG. 2A the cavity (the cavity 136 illustrated in FIG. 1B) corresponding to the circuit component 116 has a volume that creates a third gap 216 with a volume larger than the gap 212 corresponding to the circuit component 112. In this example, the circuit component 116 may have a relatively low pressure tolerance, and as such, may have a relatively large gap as compared to the circuit component 112 and 114.

Although the disclosure uses terms like "first," "second," and "third" to describe concepts related to various features (e.g., "first circuit component," "first cavity"), these ordinals are used merely for illustrative purpose. For example, any suitable number of such features may be in a circuit board assembly enclosure. Furthermore, a circuit board assembly enclosure may not include all the different types of features. For example, a circuit board assembly enclosure may include only cavities such as the first cavity and the third cavity, and no cavities such as the second cavity. One of ordinary skill in the art would recognize many variations, modifications, and alternatives.

In some embodiments, the enclosure 200 may include an envelope 210 that provides a waterproof (or air-tight) seal for the enclosure 200. For example, the envelope 210 may include a material characterized by suitable resistance to the passage of fluids including liquids and gases, for example, a plastic material, a Mylar material, or any other suitable material. In some embodiments, the envelope 210 may be tightly wrapped around the other elements of the enclosure (e.g., referencing the example of FIG. 2A, around the pressure distribution structure 120 and the circuit board 110). For example, the envelope 210 may be a polymer enclosure similar to a vacuum bag used to vacuum seal food (e.g., a polyethylene bag, a polyethylene bag with a layer of nylon). In this example, the polymer enclosure may include one or more plastic (e.g., polyethylene) layers. In some embodiments, the polymer enclosure may include one or more other layers (e.g., a fabric layer such as a nylon layer) for added strength.

Figure 2B:
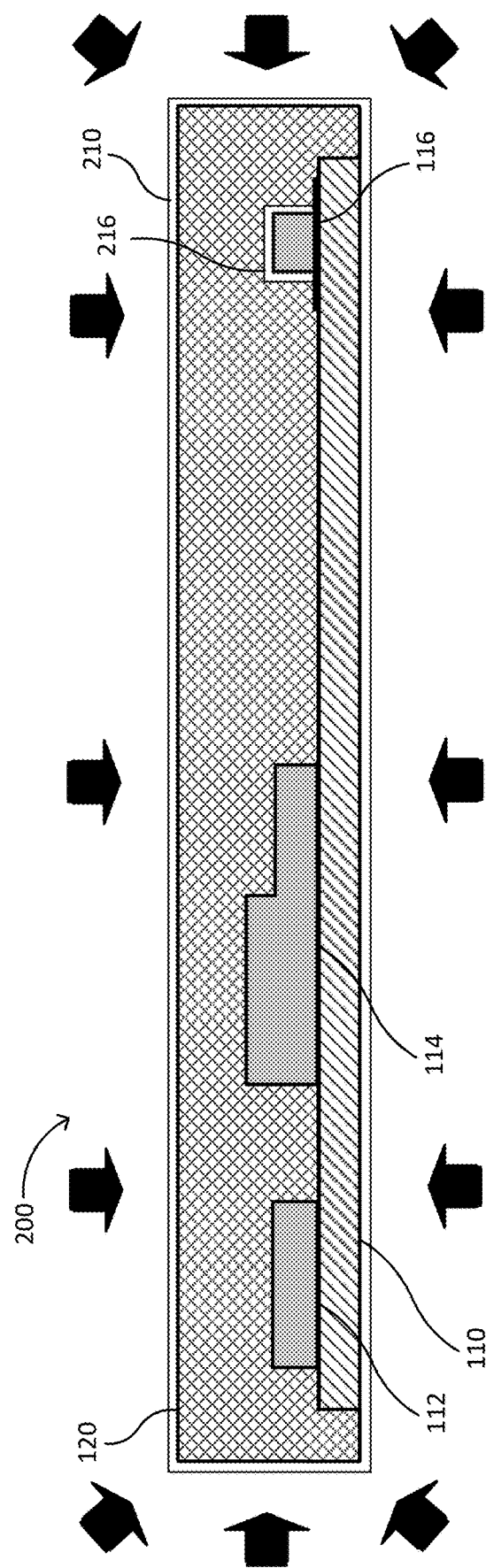
FIG. 2B is a simplified, cross-sectional schematic diagram of the circuit board assembly enclosure of FIG. 2A when it is under relatively high pressure.

FIG. 2B illustrates a simplified, cross-sectional schematic diagram of the circuit board assembly enclosure 200 of FIG. 2A when it is under relatively high pressure. In some embodiments, when the circuit board assembly enclosure is placed under extremely high pressure (e.g., 10,000 psi to 16,000 psi near the ocean floor), it experiences an inward compressive force as illustrated by the black arrows in FIG. 2B. This may result in the various elements of the enclosure being compressed inward. Typically, any gaps within the enclosure will be compressed first. In some embodiments, the gaps may be filled with air (or another compressible fluid) which is particularly suitable for compression. The example shown in FIG. 2B illustrates how the cavities may be used to vary the distribution of pressure among different circuit components. FIG. 2B illustrates a situation in which the enclosure 200 as a whole is being subjected to a particularly high pressure. The gap corresponding to the circuit component 112 (i.e., the gap 212 as illustrated in FIG. 2A) has been reduced to a point at which there is no longer an appreciable gap, while the relatively larger gap corresponding to the circuit component 116 (i.e., the third gap 216) has been reduced in size. Before this compression of the gap 212, the pressure distribution structure 120 may have been distributing a portion of the total pressure to the circuit component 114 (since there may never have been an appreciable gap even at, for example, mean sea level pressure, as shown by FIG. 2A). In the illustrated example of FIG. 2B, it is noted that the enclosure is configured to distribute pressure from the very beginning to sections of the circuit board that mate with portions of the pressure distribution structure 120. For example, referencing FIG. 1A, the portions 122, 124, 126, and 128 are configured to mate with the sections 102, 104, 106, and 108. Each of the sections 102, 104, 106, and 108 bears pressure as pressure is distributed from the beginning as the corresponding portions 122, 124, 126, and 128 push against them.

Upon compression of the gap 212 as illustrated in FIG. 2B, the pressure distribution structure 120 also begins to press down on the circuit component 112 and distribute a portion of the total pressure to the circuit component 112. In the high-pressure situation illustrated in FIG. 2B, the circuit component 114 may experience a relatively large amount of pressure, the circuit component 112 may experience less pressure, and the circuit component 116 may experience even less pressure. As explained previously, the pressure distribution structure 120 may be constructed to distribute pressure in this manner, due to the known pressure tolerances of the different circuit components. For example, the circuit component 114 may be a strong component capable of withstanding high-pressure, while the circuit component 116 may be a relatively pressure-sensitive structure that may break or cease to function optimally under even slightly elevated pressure. In this example, the circuit component 116 may be a crystal oscillator, which may need to be kept at sea level pressure. As such, the third gap 216 corresponding to the circuit component 116 may be constructed so that the pressure distribution structure 120 never contacts the circuit component 116 when the enclosure is exposed to a maximum intended pressure (e.g., 15,750 psi).

Figure 2C:
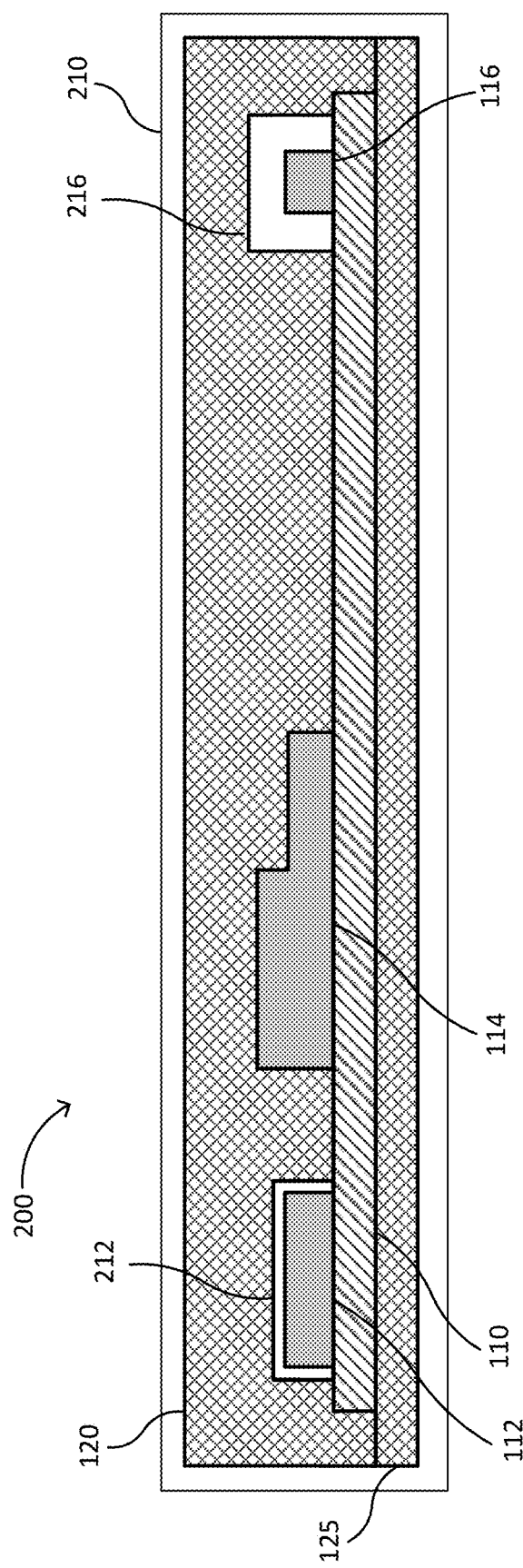
FIG. 2C illustrates another simplified, cross-sectional schematic diagram of an example circuit board assembly enclosure including a second pressure distribution structure according to an embodiment of the present invention.

FIG. 2C illustrates another simplified, cross-sectional schematic diagram of an example circuit board assembly enclosure 200 including a second pressure distribution structure 125 according to an embodiment of the present invention. In some embodiments, as illustrated in the example shown in FIG. 2C, the enclosure 200 may have a first pressure distribution structure 120 disposed on a first side of the circuit board assembly and a second pressure distribution structure 125 disposed on a second side of the circuit board assembly. In the illustrated example, the second pressure distribution structure may help absorb some of the pressure experienced by the enclosure 200. In some embodiments, the first pressure distribution structure 120 and the second pressure distribution structure 125 may be separately manufactured and secured to each other during assembly (e.g., using an adhesive, screws, bolts, or any other securing mechanism). In other embodiments, the first pressure distribution structure 120 and the second pressure distribution structure 125 may be a single, integral structure.

Figure 2D:
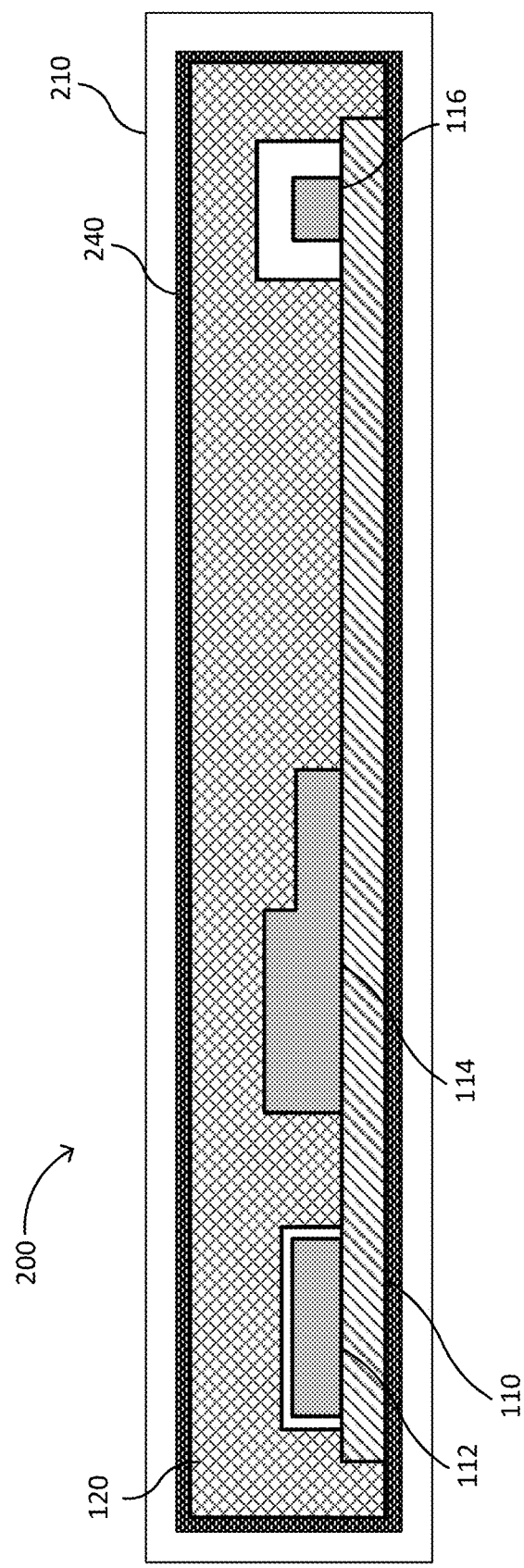
FIG. 2D illustrates another simplified, cross-sectional schematic diagram of an example of an enclosure, with a sealing layer disposed beneath the envelope according to an embodiment of the present invention.

FIG. 2D illustrates another simplified, cross-sectional schematic diagram of an example of an enclosure 200, with a sealing layer 240 disposed beneath the envelope 210 according to an embodiment of the present invention. In some embodiments, the material forming the pressure distribution structure and/or the circuit board may be a porous material (e.g., FR-4) that includes small pores. In some embodiments, depending on the material forming the envelope 210, when the enclosure 200 is under high pressure, the envelope 210 may press inward to fill these pores and may create a risk of rupture of the envelope 210. For example, an envelope 210 that is composed of a polymer material may provide excellent waterproofing, but may not be strong enough to withstand the stretching (without rupturing) that may occur during high pressure if there are pores in the material it is wrapping. This could be fatal for the components within the enclosure 200, as the smallest rupture under high pressure could lead to water seeping into the enclosure 200 and damaging the circuitry therein. In these embodiments, the sealing layer 240 may include a fabric material. For example, the sealing layer may be an adhesive tape including a woven fabric (e.g., cloth) and coated with a polymer such as polyethylene. As another example, a fabric that is not part of an adhesive or a polymer material (e.g., silicone) may be wrapped or overmolded around the outer surfaces of the pressure distribution structure 120 and the circuit board 110. In this example, referencing FIG. 2D, the outer surfaces may be wrapped in the sealing layer 240 (e.g., adhesive tape), and the envelope 210 (e.g., a vacuum-sealed enclosure) may be wrapped over the sealing layer 240. The envelope 210 may then be vacuum sealed. In this way, the envelope 210 and the sealing layer 240 together form a composite structure that is waterproof, compliant, and durable.

In some embodiments, a nonporous material may be used to make up the pressure distribution structure 120 and/or the circuit board 110. Alternatively, in some embodiments, a further nonporous layer may surround the pressure distribution structure 120 and/or the circuit board 110. In these embodiments, a separate sealing layer 240 may not be required. In some embodiments, the outer surfaces of the pressure distribution structure 120 and/or the circuit board 110 may be finished/processed in such a way that they are nonporous and or have very small pores. For example, the outer surfaces may be coated with an epoxy layer and/or sanded to make them smooth. In some of these embodiments, a separate sealing layer 240 may not be needed. In some other of these embodiments, a separate sealing layer 240 may still be used. One of ordinary skill in the art would recognize many variations, modifications, and alternatives.

Figure 2E:
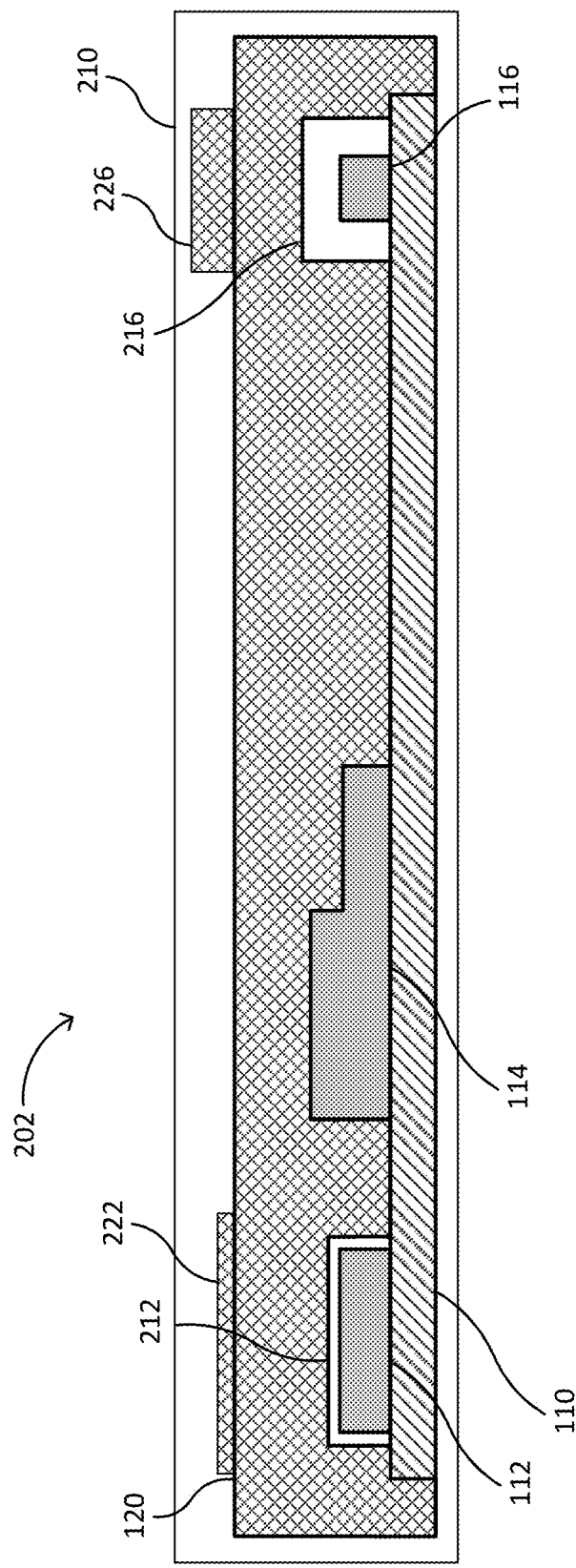
FIG. 2E illustrates another simplified, cross-sectional schematic diagram of an example enclosure, with the pressure distribution structure having a varied outer profile according to an embodiment of the present invention.

FIG. 2E illustrates another simplified, cross-sectional schematic diagram of an example enclosure 202, with the pressure distribution structure 120 having a varied outer profile according to an embodiment of the present invention. In some embodiments, additional material (e.g., which may be the same material as the pressure distribution structure 120) may be added to the pressure distribution structure in areas above air gaps formed by a cavity. This additional material may serve to provide additional structural support to these areas to prevent them from deforming more than a predetermined amount. In some embodiments, as illustrated in the example of FIG. 2E, the height of the additional material added may be based on the gap size. For example, referencing FIG. 2D, the height of the additional material 222 may be associated with (e.g., directly proportional to) the gap size, with a larger gap size translating to more additional material. Although FIG. 2E illustrates the additional material 222 and 226 as components separate from the pressure distribution structure 120, the disclosure contemplates that the additional material 222 and 226 and the pressure distribution structure 120 may form a single integral structure. That is, the pressure distribution structure 120 may be shaped to include the additional material 222 and 226.

In other embodiments (e.g., as in FIGS. 2A-2D), the outer profile may not be varied, in which case the thickness of the pressure distribution structure for the area over the largest gap may be determined, and this may set the height of the pressure distribution structure. For example, referencing FIG. 2A, a predetermined, e.g., optimal, height of the pressure distribution structure 120 may be determined based on the size of the third gap 216, which may be the largest gap in the enclosure 200.

Figure 3:
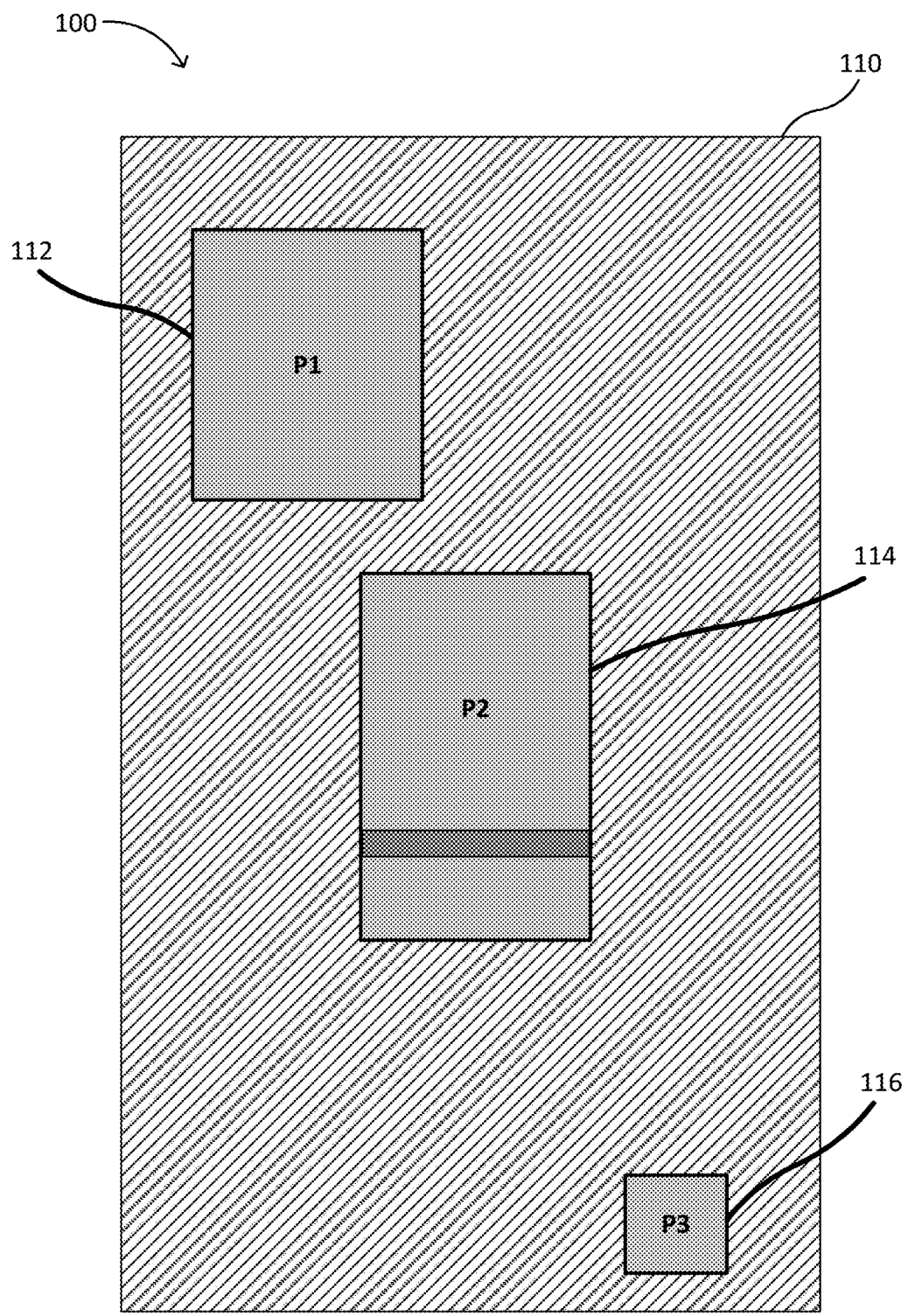
FIG. 3 illustrates a plan view of the example circuit board assembly illustrated in FIG. 1.

FIG. 3 illustrates a plan view of the example circuit board assembly 100 illustrated in FIG. 1. A pressure distribution structure (not illustrated) may have cavities that conform to the shapes and volumes of the illustrated circuit components 112, 114, and 116, and may be positioned over the circuit board assembly 100. As explained previously, the volumes of the cavities may be configured to distribute pressures across the circuit board assembly 100 based on pressure tolerances of the various circuit components. For example, the circuit component 112 may have a pressure tolerance of P1, which may correspond to the maximum pressure value beyond which the circuit component 112 ceases to function optimally; the circuit component 114 may have a pressure tolerance of P2, which may correspond to the maximum pressure value beyond which the circuit component 114 ceases to function optimally; and the circuit component 116 may have a pressure tolerance of P3, which may correspond to the maximum pressure value beyond which the circuit component 116 ceases to function optimally.

Figure 4:
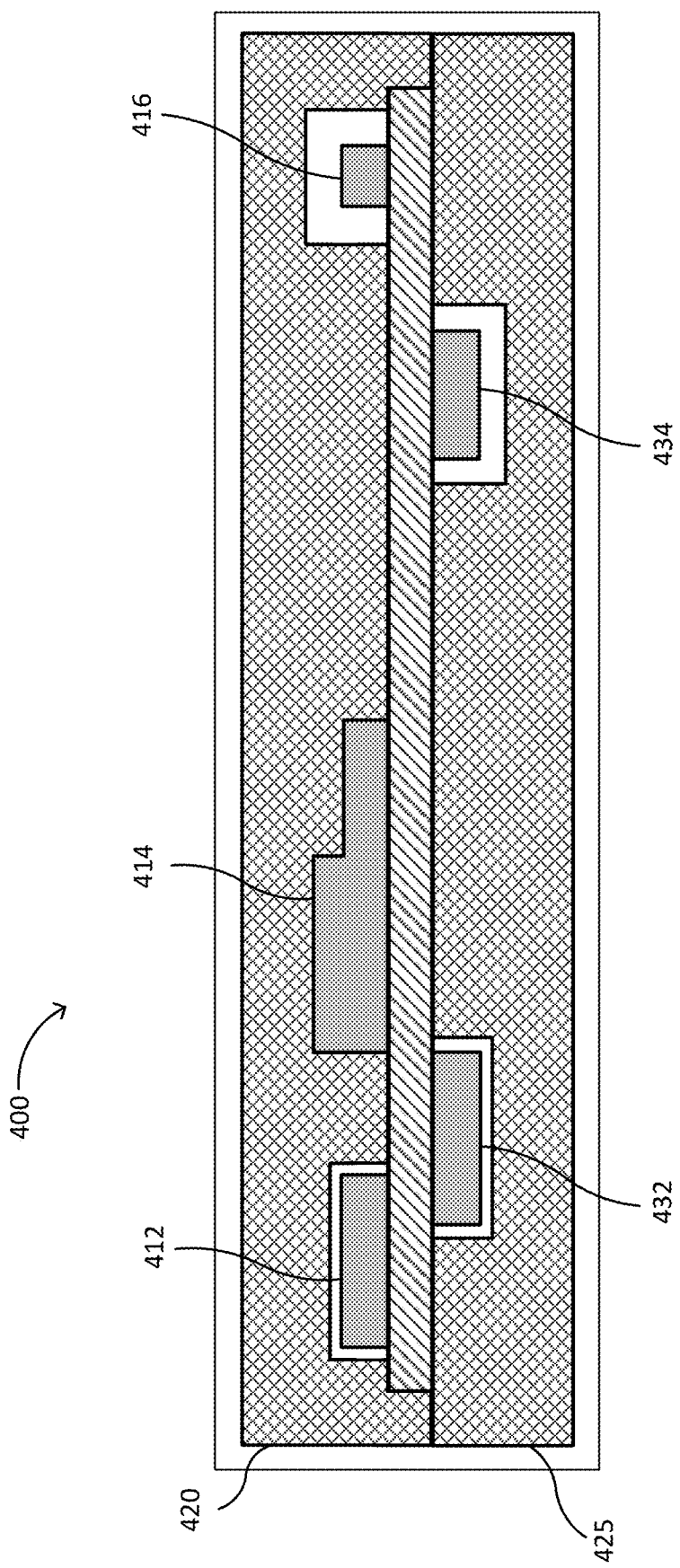
FIG. 4 is a simplified, cross-sectional schematic diagram of a circuit board assembly enclosure enclosing a circuit board assembly with circuit components mounted on both surfaces according to an embodiment of the present invention.

FIG. 4 is a simplified, cross-sectional schematic diagram of a circuit board assembly enclosure 400 enclosing a circuit board assembly with circuit components mounted on both surfaces according to an embodiment of the present invention. In some embodiments, circuit board assemblies may have circuit components mounted on both surfaces. In these cases, a pressure distribution structure is formed to account for pressure tolerances of circuit components on both surfaces. Referencing FIG. 4, a first pressure distribution structure 420 may be positioned over the circuit board assembly to distribute pressure across the top surface of the circuit board assembly (which includes the circuit components 412, 414, and 416), and a second pressure distribution structure 425 may be positioned over the circuit board assembly to distribute pressure across the bottom surface of the circuit board assembly (which includes the circuit components 432 and 434). As illustrated, the first pressure distribution structure 420 includes cavities corresponding to the circuit components mounted on the top surface (e.g., with gap sizes based on the pressure tolerances of each of the circuit components 412, 414, and 416), while the second pressure distribution structure 425 includes cavities corresponding to the circuit components mounted on the bottom surface (e.g., with gap sizes based on the pressure tolerances of each of the circuit components 432 and 434).

Figure 5A:
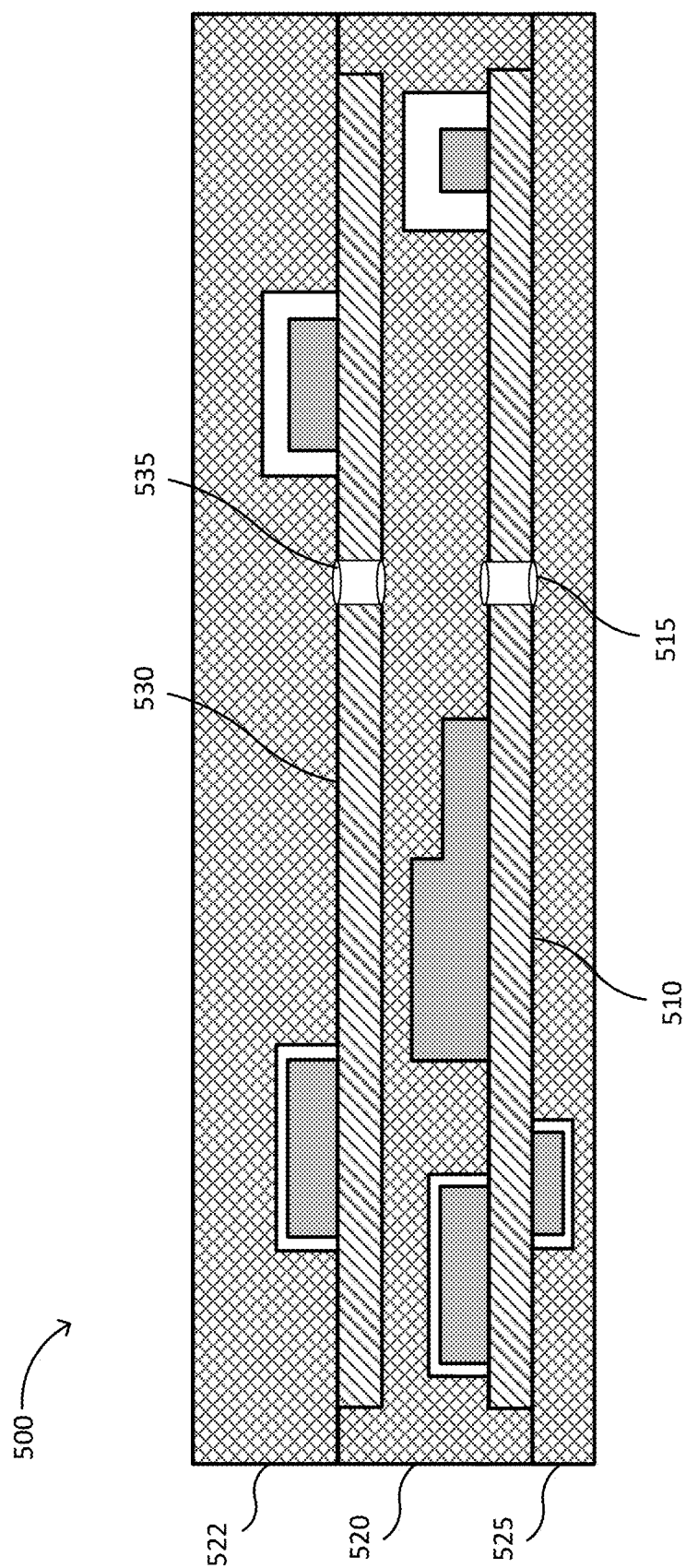
FIG. 5A is a simplified, cross-sectional schematic diagram of a circuit board assembly enclosure that includes two circuit board assemblies according to an embodiment of the present invention.

FIG. 5A illustrates a simplified, cross-sectional schematic diagram of an example circuit board assembly enclosure 500 that includes two circuit board assemblies according to an embodiment of the present invention. In some embodiments, multiple circuit board assemblies may be layered together. In these embodiments, pressure distribution structures may be disposed in between each adjacent circuit board assembly to adequately distribute pressure across circuit board components as explained above. For example, referencing FIG. 5A, the enclosure 500 may include two circuit boards 510 and 530 with circuit components mounted thereon, pressure distribution structure 522 above the circuit board 530, the pressure distribution structure 520 in between the two circuit boards, and the pressure distribution structure 525 beneath the circuit board 510.

In some embodiments, circuit board assembly enclosures may include one or more vias to enhance thermal conductivity. Operations of the circuitry (e.g., the operations of one or more processors) may generate a significant amount of heat over time that needs to be conducted away from the enclosure to prevent damage and to ensure device functionality. Materials of the enclosure (e.g., the pressure distribution structure material, the circuit board material) may be selected to afford sufficient thermal conductivity. Vias may be used to help conduct heat away from the circuit board toward the exterior of the enclosure. For example, referencing FIG. 5A, the circuit boards 530 and 510 may include vias 535 and 515, respectively, to assist with conducting heat away from the circuit board toward the pressure distribution structures (e.g., 522, 520, 525). These vias may be air gaps (air may afford a level of convection in addition to conduction) or a conductive material such as a metal, for example, copper.

Figure 5B:
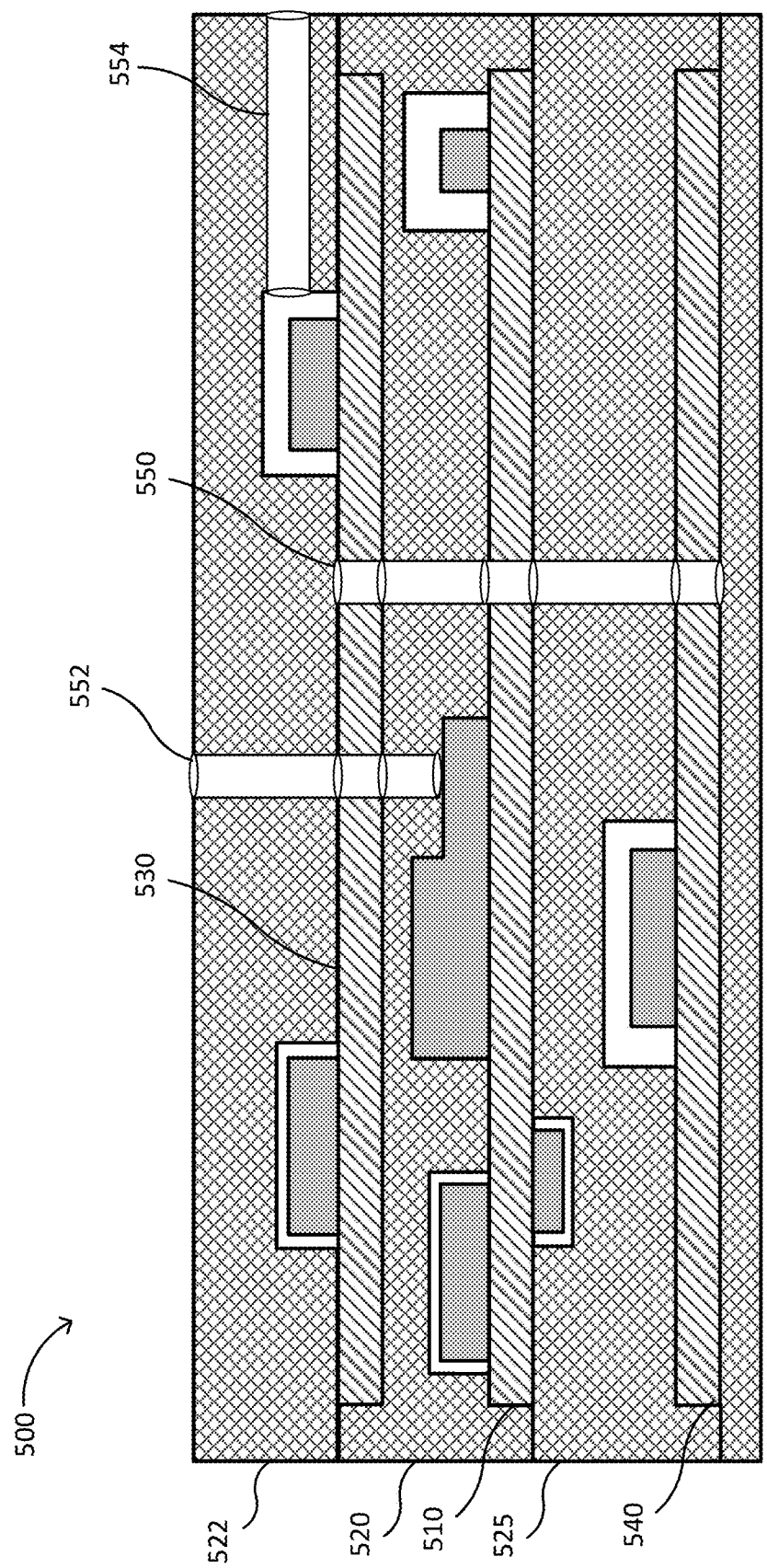
FIG. 5B is a simplified, cross-sectional schematic diagram of a circuit board assembly enclosure that includes three circuit board assemblies according to an embodiment of the present invention.

FIG. 5B illustrates a simplified, cross-sectional schematic diagram of an example circuit board assembly enclosure 500 that includes three circuit board assemblies according to an embodiment of the present invention. In some embodiments, one or more complexes of vias may be used to conduct heat away from a circuit board that is disposed between two or more other circuit boards. Referencing FIG. 5B, for example, a complex of vias 550 may extend through the circuit boards 510, 530, and 540. This complex of vias may serve as a thermally conductive pathway for heat to reach the pressure-distribution structure and be ultimately conducted away from the circuit board assembly enclosure 500. In some embodiments, vias (or a complex of vias) may extend through a pressure distribution structure of the circuit board assembly enclosure 500, which may allow for further conveyance of heat from the circuit board assembly enclosure 500. For example, as illustrated in FIG. 5B, the complex of vias 552 extends through the pressure distribution structure 522. As another example, again referencing FIG. 5B, the via 554 extends sideways through the pressure distribution structure 522. Also as illustrated by the complex of vias 552 and the via 524, in some embodiments, one or more of the vias may lead directly to components that generate heat. This may be especially useful for conveying heat away from components known to generate relatively large amounts of heat. Although heat may dissipate in embodiments where the pressure distribution structures are thermally conductive (e.g., when they are made of FR-4), the vias may provide a further pathway for heat to dissipate, especially in the case of circuit boards such as the circuit board 510, which is between the circuit boards 530 and 540 (in which case, it may be more difficult to direct heat to the exterior). Although vias in the complex of vias 550 are illustrated as aligned along a common axis in FIG. 5B, this is not required and other arrangements can be utilized within the scope of the present disclosure.

Figure 6:
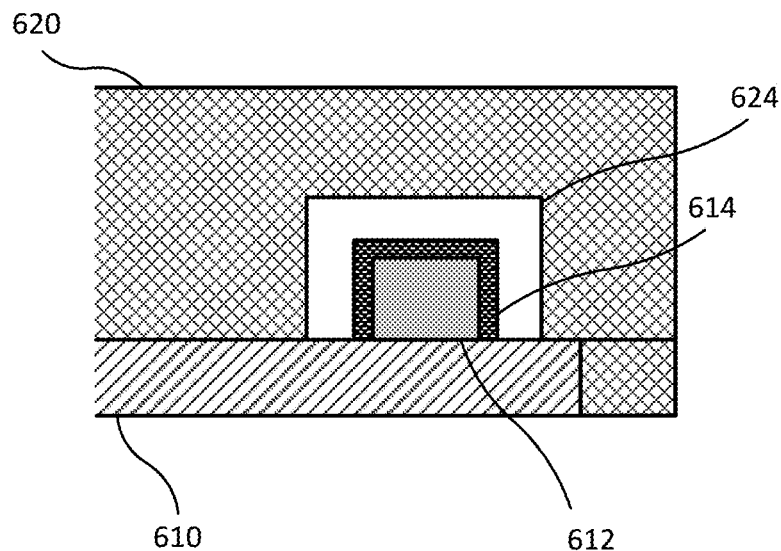
FIG. 6 illustrates a simplified, cross-sectional schematic diagram of a portion of a circuit board assembly enclosure with a pressure distributing layer disposed around a mounted circuit component according to an embodiment of the present invention.

FIG. 6 illustrates a simplified, cross-sectional schematic diagram of a portion of a circuit board assembly enclosure with a pressure distributing layer 614 disposed around a mounted circuit component 612 according to an embodiment of the present invention. In some embodiments, a pressure distributing layer may be disposed around (e.g., adhered to, deposited on) circuit components to absorb and/or redirect some of the pressure that would otherwise be experienced by the circuit components. For example, the pressure distributing layer may be a polymer, such as an elastic polymer (e.g., rubber). One or more cavities of the pressure distribution structure pressure may be dimensioned so as to create one or more gaps that accommodate one or more pressure distributing layers. For example, referencing FIG. 6, the pressure distribution structure 620 may include a cavity that creates the gap 624 when the pressure distribution structures 620 is positioned on the circuit board 610. As illustrated, the gap 624 is large enough to accommodate the pressure distributing layer 614 (e.g., a rubber layer), as well as an air gap around the pressure distributing layer 614. In some embodiments, the cavity may be dimensioned so as to only allow for a pressure distributing layer (and no air gap).

Figure 7A:
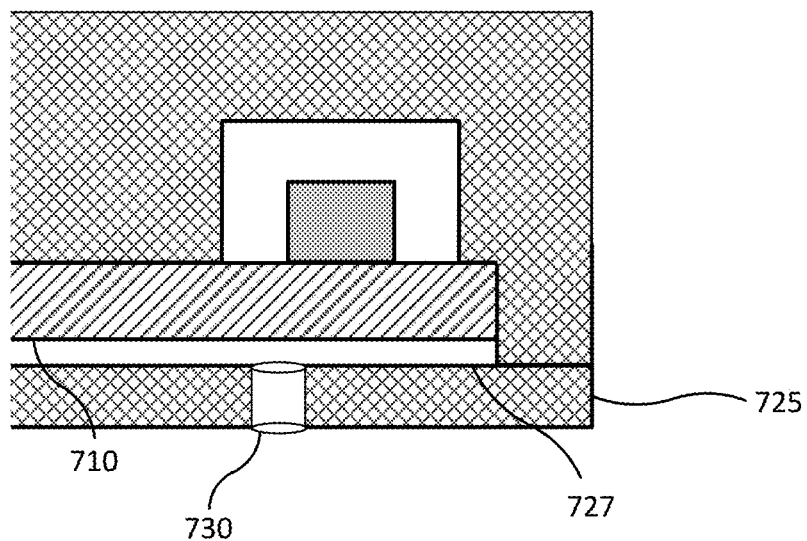
FIG. 7A illustrates a simplified, cross-sectional schematic diagram of a portion of a circuit board assembly enclosure with a thermally conductive layer according to an embodiment of the present invention.

FIG. 7A illustrates a simplified, cross-sectional schematic diagram of a portion of a circuit board assembly enclosure with a thermally conductive layer 727 according to an embodiment of the present invention. In some embodiments, the enclosure may include one or more conductive layers that include thermally conductive materials (e.g., a metal such as copper). For example, referencing FIG. 7A, the thermally conductive layer 727 may help conduct heat away from the circuit board 710. In some embodiments, one or more vias may be used to conduct heat from a thermally conductive layer (e.g., to an exterior of the enclosure). For example, referencing FIG. 7A, a via 730 may be disposed within the pressure distribution structure 725 so as to conduct heat from the thermally conductive layer 727 to the exterior of the enclosure.

Figure 7B:
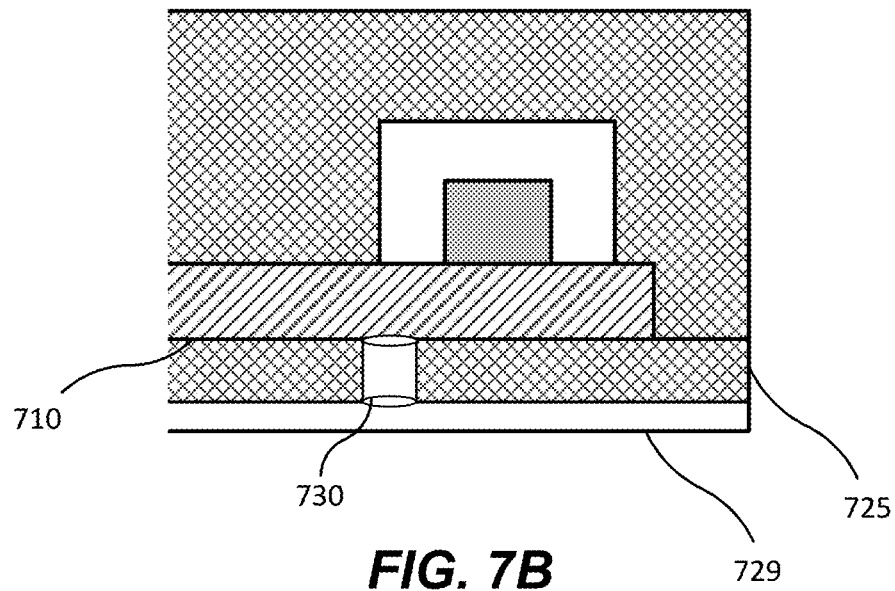
FIG. 7B illustrates another simplified, cross-sectional schematic diagram of a portion of a circuit board assembly enclosure with a thermally conductive layer according to an embodiment of the present invention.

FIG. 7B illustrates a simplified, cross-sectional schematic diagram of a portion of a circuit board assembly enclosure with a thermally conductive layer 729 according to an embodiment of the present invention. In some embodiments, one or more vias may be used to conduct heat to a thermally conductive layer (e.g., which may be disposed toward the outside of the enclosure). For example, referencing FIG. 7B, the via 730 may be used to conduct heat from the circuit board 710 to the thermally conductive layer 729, which may then conduct the heat to the exterior of the enclosure.

Figure 7C:
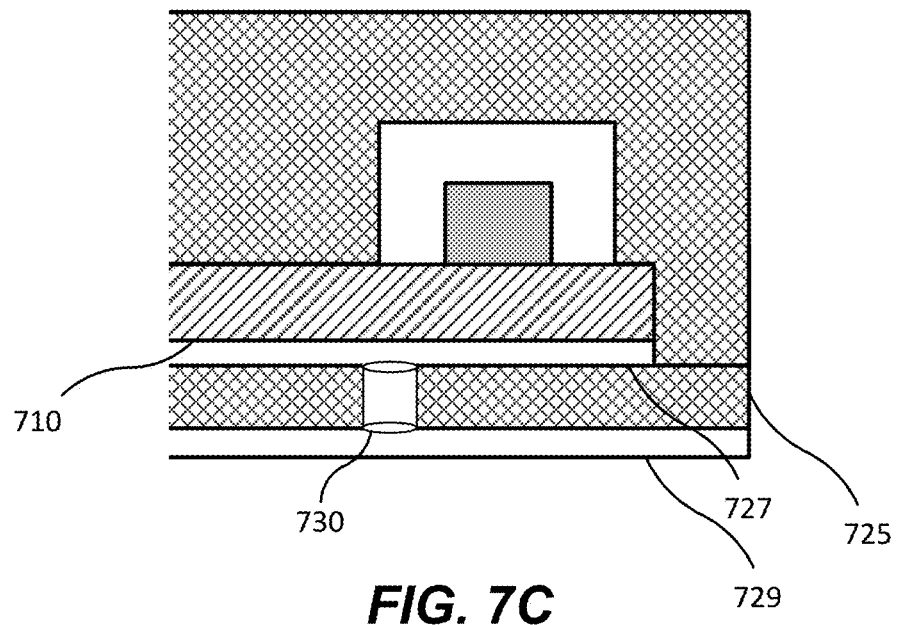
FIG. 7C illustrates a simplified, cross-sectional schematic diagram of a portion of a circuit board assembly enclosure with thermally conductive layers and a via therebetween according to an embodiment of the present invention.

FIG. 7C illustrates a simplified, cross-sectional schematic diagram of a portion of a circuit board assembly enclosure with thermally conductive layers 727 and 729 and a via therebetween according to an embodiment of the present invention. In some embodiments, the enclosure may include a first thermally conductive layer near a circuit board and a second thermally conductive layer on or near the exterior of the enclosure. In some of these embodiments, one or more vias may be disposed between the thermally conductive layers (e.g., so as to thermally couple the thermally conductive layers and thereby facilitate the conduction of heat across the thermally conductive layers). For example, referencing FIG. 7C, an enclosure may include a first thermally conductive layer 727 near the circuit board 710, a second thermally conductive layers 729 on the exterior of the enclosure, and a via 730 that thermally couples the two thermally conductive layers. Although FIG. 7C illustrates only two thermally conductive layers and one via therebetween, the disclosure contemplates any suitable number of thermally conductive layers and any suitable number of vias therebetween.

Figure 8A:
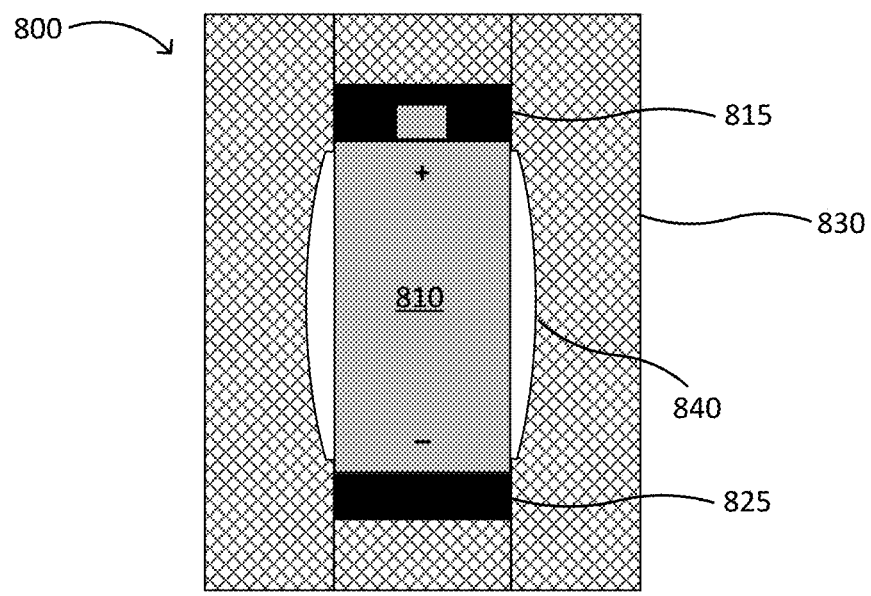
FIG. 8A illustrates a simplified, cross-sectional schematic diagram of an example battery enclosure for absorbing and/or distributing pressure across a battery in a predetermined manner according to an embodiment of the present invention.

FIG. 8A illustrates a simplified, cross-sectional schematic diagram of an example of a battery enclosure 800 for absorbing and/or distributing pressure across a battery 810 in a predetermined manner according to an embodiment of the present invention. Batteries that are able to function in extreme high-pressure environments (e.g., batteries within deep-water exploration vehicles) are typically very expensive (e.g., custom lithium-ion polymer batteries). In contrast with these conventional batteries, some embodiments of the present invention utilize more conventional batteries (e.g., commercially available D-cell or AA-cell batteries) to be able to reduce costs of equipment in use cases such as deep-water exploration. In some embodiments, an enclosure may be constructed for allowing even a conventional battery to operate in extreme high-pressure environments. Accordingly, the enclosure may be designed with structural properties of the battery as a design parameter in mind. Similar to the circuit board assembly enclosure described above, the battery enclosure may be constructed to distribute pressure differently across different areas of the battery, such that relatively more pressure is distributed to areas of the battery with higher pressure tolerances as compared to areas of the battery with lower pressure tolerances. To achieve the object, referencing FIG. 8A as an example, one or more pressure distribution structures 830 may be positioned around the battery 810. The distribution of pressure across different areas of the battery may be controlled by controlling the gap size across different regions of the battery (by varying the size of the one or more cavities in the pressure distribution structure 830). In some embodiments, referencing FIG. 8A, the battery 810 may be configured such that it has a first end (e.g., the positive terminal at the top of the battery 810), a second end (e.g., the negative terminal at the bottom of the battery 810), and a middle portion (e.g., the region in between). In some of these embodiments, the middle portion of the battery may have the lowest pressure tolerance, and may be susceptible to collapse if subjected to too much pressure. By contrast, the first and second ends may have the highest pressure tolerance.

To account for this varied pressure tolerance, the enclosure may have a pressure distribution structure 830 that includes cavities configured to create a gap 840 around the battery that varies in gap size along the length of the battery 810. For example, as illustrated in FIG. 8A, the gap size is largest near the middle of the battery and smallest near the ends of the battery. As such, when the battery enclosure 800 is placed under a particularly high pressure, the ends of the battery 810 may be subjected to more pressure than the middle portion of the battery 810 (e.g., as the pressure distribution structure 830 compresses inward). The battery enclosure 800 may also include one or more connectors (e.g., the positive connector 815 and the negative connector 825) for electrically coupling the battery 810 to circuitry as appropriate to a particular implementation.

Figure 8B:
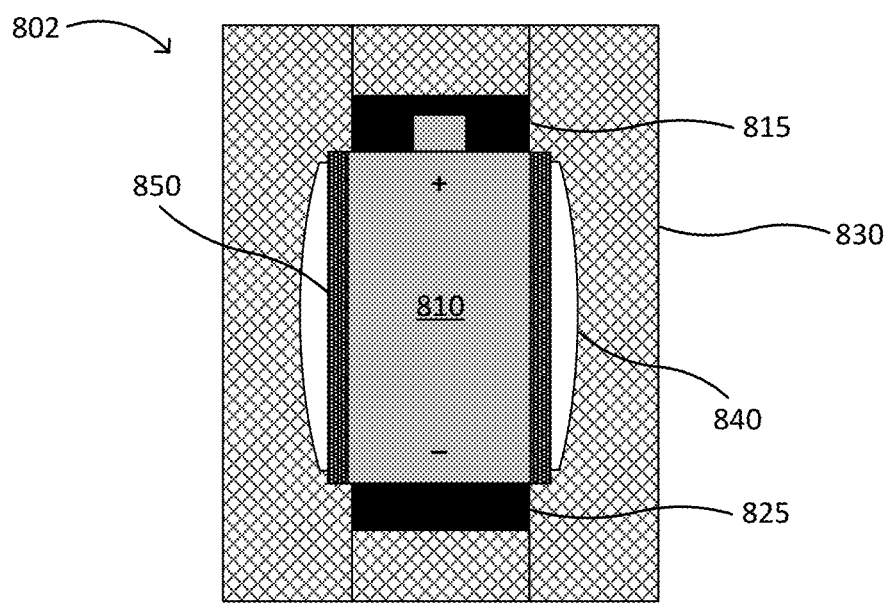
FIG. 8B illustrates a simplified, cross-sectional schematic diagram of an example of the battery enclosure that includes a support layer according to an embodiment of the present invention.

FIG. 8B illustrates a simplified, cross-sectional schematic diagram of an example of the battery enclosure 802 that includes a support layer according to an embodiment of the present invention. In some embodiments, the battery enclosure may also include additional support layers to provide further support to the battery. For example, referencing FIG. 8B, a support layer 850 may be wrapped around the battery 810. The support layers may be composed of any suitable material that has pressure absorbing/distributing properties, or a material that otherwise increases the strength of the battery so as to prevent collapse of the battery. For example, referencing FIG. 8B, the support layer 850 may be a carbon fiber layer wrapped around the battery 810. As another example, the support layer 850 may be an elastic polymer layer.

Figure 8C:
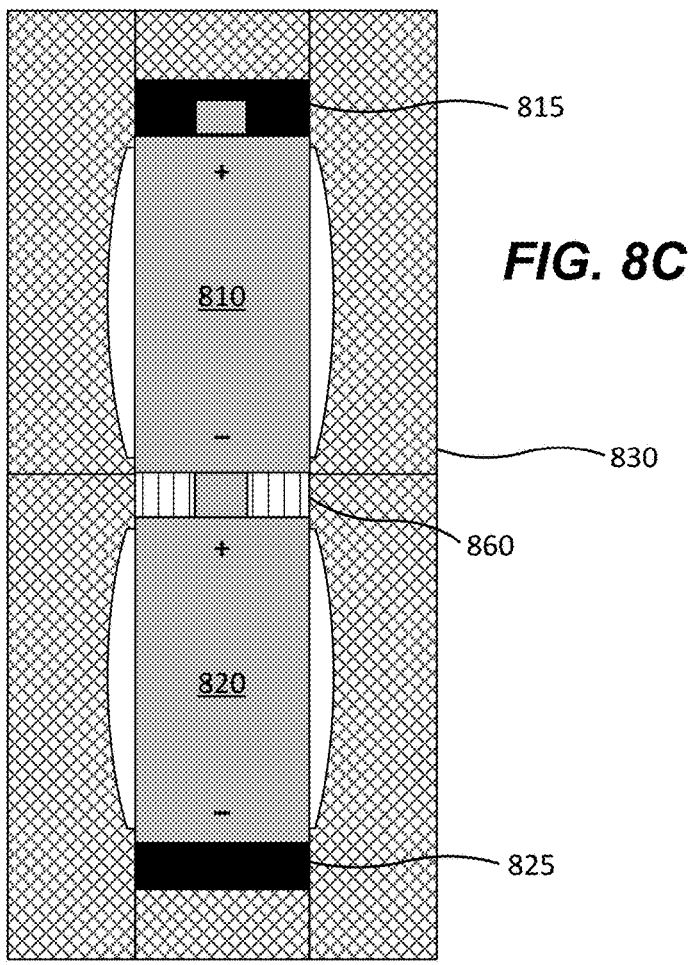
FIG. 8C illustrates a simplified, cross-sectional schematic diagram of an example battery assembly including two batteries and with a pressure-absorbing layer disposed therebetween according to an embodiment of the present invention.

FIG. 8C illustrates a simplified, cross-sectional schematic diagram of an example battery assembly including two batteries 810 and 820 and with a pressure-absorbing structure 860 disposed therebetween according to an embodiment of the present invention. In some embodiments, the battery enclosure may include multiple batteries that may have one or more pressure-absorbing layers positioned in between the batteries. For example, referencing FIG. 8C, the battery enclosure 800 includes the pressure-absorbing structure 860 sandwiched in between the first battery 810 and the second battery 820. In some embodiments, the pressure-absorbing structure may be formed to contact the first end of the first battery (e.g., the bottom of the first battery 810) and an end of the second battery (e.g., the top of the second battery 820). In some embodiments, the pressure-absorbing structure may be dimensioned so as to extend radially outward to approximately the outer perimeter of the batteries. For example, referencing FIG. 8C, the pressure-absorbing structure 860 has a circumference that is about the same circumference as the batteries 810 and 820.

Figure 8D:
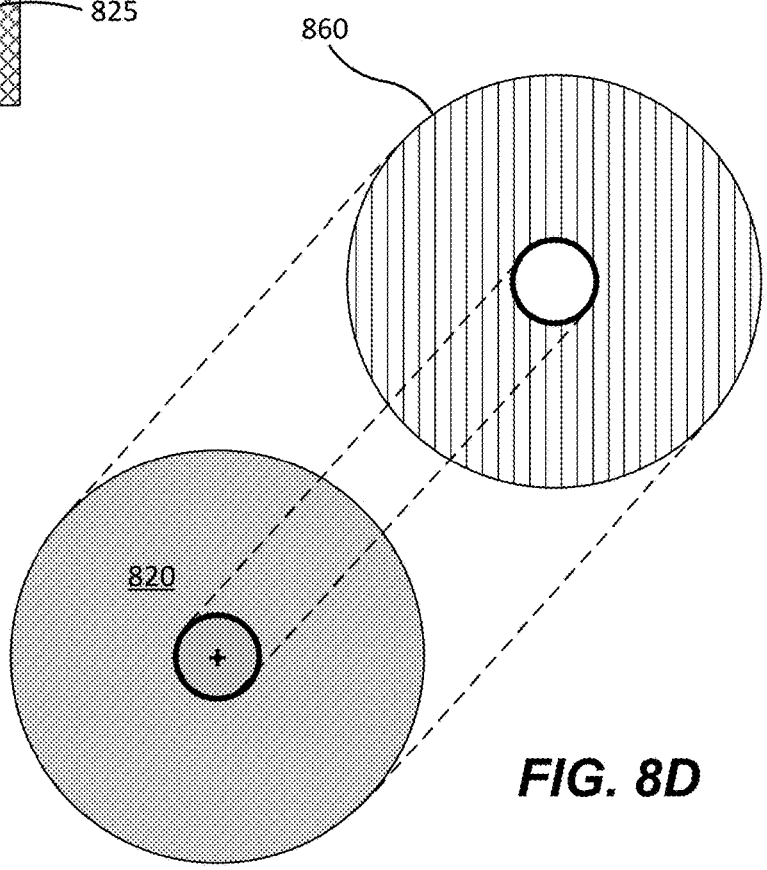
FIG. 8D illustrates a plan view of the battery and the pressure-absorbing structure of FIG. 8C.

FIG. 8D illustrates a plan view of the battery 820 and the pressure-absorbing structure 860 of FIG. 8C. In some embodiments, the pressure-absorbing structure may include an aperture configured to accommodate a protrusion of a terminal from the first end of a battery (e.g., the positive terminal at the top of the second battery 820). Such protrusions are common for many off-the-shelf batteries (e.g., D-cell batteries), and the aperture of the pressure-absorbing structure 860 (e.g., layer) may allow for the use of such batteries.

Figure 8E:
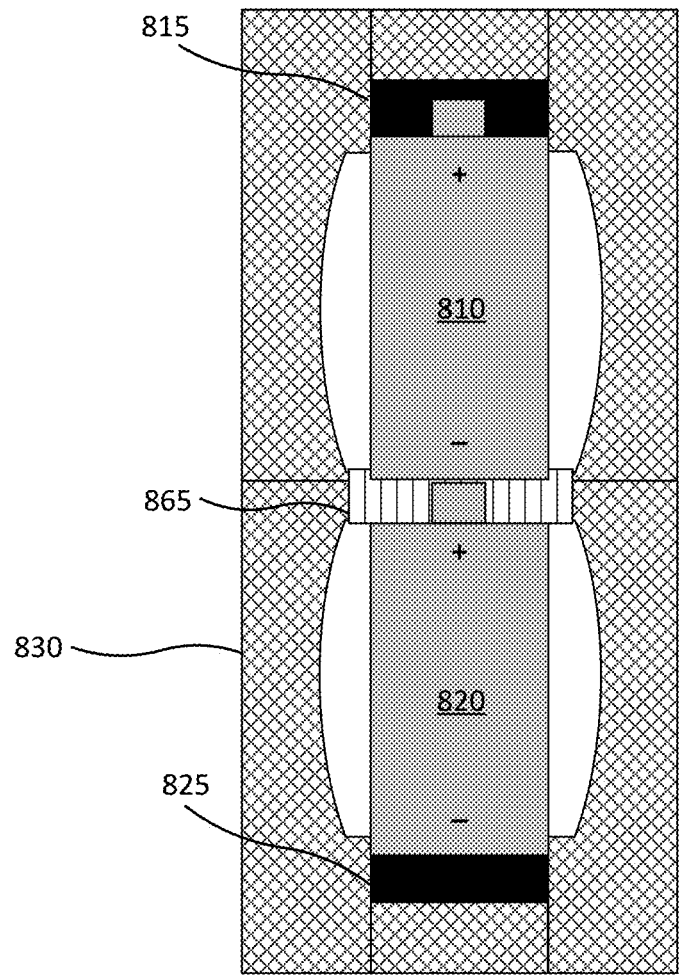
FIG. 8E illustrates a simplified, cross-sectional schematic diagram of another example battery assembly including two batteries and with a pressure-absorbing layer disposed therebetween according to an embodiment of the present invention.

FIG. 8E illustrates a simplified, cross-sectional schematic diagram of another example battery assembly including two batteries 810 and 820 and with a pressure-absorbing structure 865 disposed therebetween according to an embodiment of the present invention. In some embodiments, the pressure-absorbing structure may be dimensioned to extend radially outward beyond an outer perimeter of the first battery and an outer perimeter of the second battery. For example, referencing FIG. 8E, the pressure-absorbing structure 865 has a circumference that is greater than the circumference of the batteries 810 and 820. In such embodiments, the pressure-absorbing structure 865 may absorb a greater amount of pressure (as compared to the example embodiment of FIG. 8C), relieving some of the pressure from the ends of the batteries 810 and 820 at their interface. In some embodiments, pressure-absorbing structures similar to the illustrated pressure-absorbing structure 865 may also be disposed at each end of the batteries (e.g., referencing FIG. 8C or FIG. 8E, at the top and bottom ends of the batteries 810 and 820).

Although FIGS. 8A-8C and 8E illustrate gaps formed by cavities that gradually vary (e.g., in a parabolic manner), the disclosure contemplates any suitable means of varying the gap size. For example, the gap size may be varied in discrete steps. One of ordinary skill in the art would recognize many variations, modifications, and alternatives. In some embodiments, a battery or battery assembly may be protected by wrapping the batteries with a material having high strength under compression, without separate pressure distribution structures. For example, a battery may be wrapped in a carbon fiber material. As another example, a battery assembly having two or more batteries mechanically coupled in series may be wrapped in carbon fiber material, and may also have a pressure-absorbing structure (e.g., the pressure-absorbing structure 860 illustrated in FIGS. 8C-8D).

In some embodiments, the battery enclosure may also be constructed to waterproof the battery. For example, similar to the circuit board assembly enclosure, the battery enclosure may be surrounded by an envelope and/or sealing layer as described above with respect to the circuit board assembly enclosure.

Figure 9:
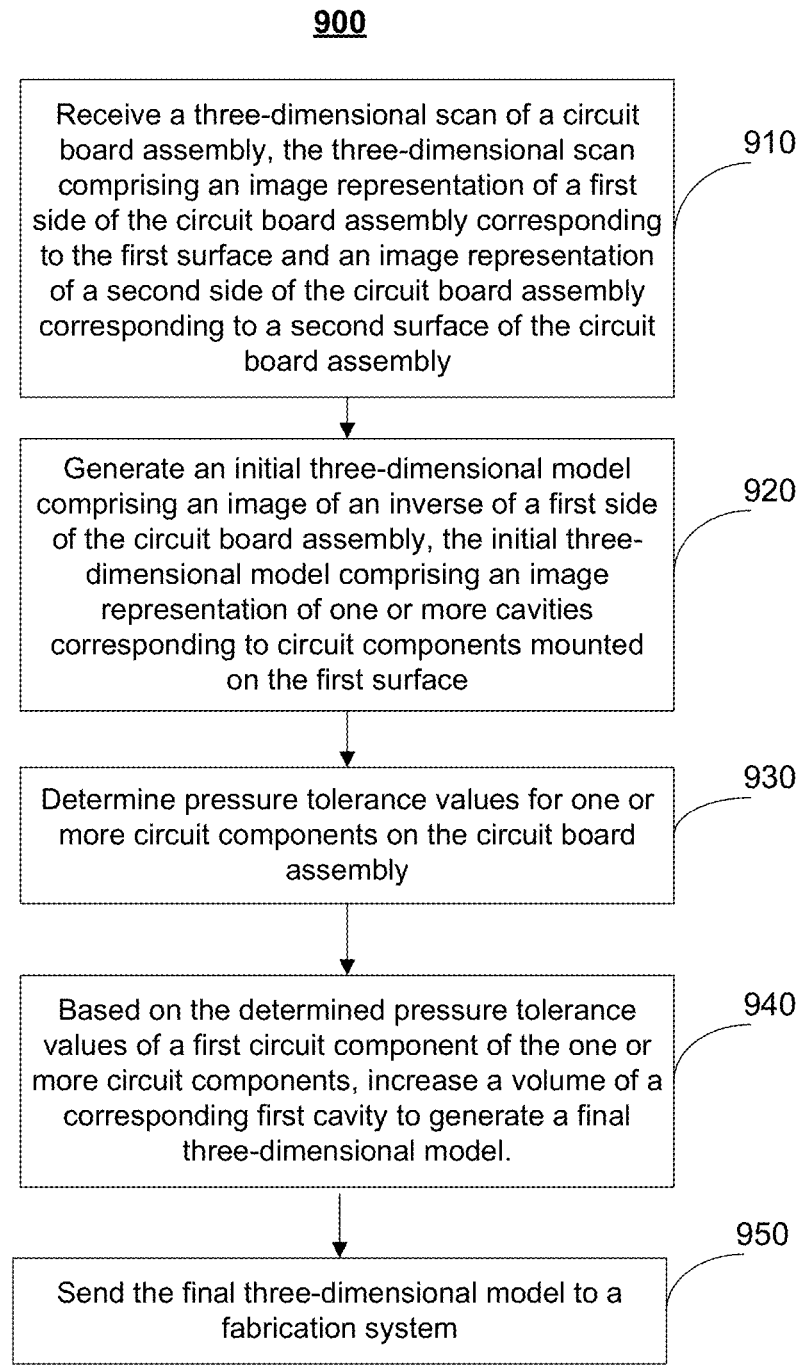
FIG. 9 illustrates an example method for manufacturing a custom enclosure structure for distributing pressure across a circuit board assembly in a predetermined manner according to an embodiment of the present invention.

The enclosures described herein may be designed and manufactured in any suitable manner. FIG. 9 illustrates an example method 900 for manufacturing a custom enclosure structure for distributing pressure across a circuit board assembly in a predetermined, e.g., optimal, manner according to an embodiment of the present invention. As discussed above, such an enclosure structure (e.g., the pressure-distribution structure described above) may be designed to accommodate a circuit board assembly including one or more circuit boards onto which one or more circuit components are mounted on one or more surfaces of each circuit board. The example method of FIG. 9 may include receiving a three-dimensional scan of the circuit board assembly (step 910). The three-dimensional scan may include an image representation of a first side of the circuit board assembly corresponding to the first surface and an image representation of a second side of the circuit board assembly corresponding to a second surface of the circuit board assembly. In the case of a circuit board assembly with multiple circuit boards, the three-dimensional scan may include an image representation of the surfaces and circuit components of all the circuit boards in the circuit board assembly. The three-dimensional scan may be performed by any suitable scanner, and data (e.g., in the form of an image data file) from the scan may be transmitted to a computing system having one or more processors.

The method also includes generating an initial three-dimensional model including an image representation of an inverse of a first side of the circuit board assembly (step 920). The initial three-dimensional model may include an image representation of one or more cavities corresponding to the circuit components mounted on the first surface. In some embodiments, the above-referenced computing system may run a software program that is able to automatically generate this three-dimensional model.

The method further includes determining pressure tolerance values for one or more circuit components on the circuit board assembly (step 930). In some embodiments, determining the pressure tolerances may include receiving and analyzing an image of the circuit board assembly. In some embodiments, this image may be a two-dimensional photograph taken by a camera device and transmitted to the computing system. In other embodiments, the image may be a schematic diagram (e.g., a computer-aided design (CAD) file) that may have been created, for example, by a manufacturer of the circuit board assembly. In some embodiments, the image may be generated based on the three-dimensional scan, or the image may be the three-dimensional scan itself. In any of these embodiments, the computing system may identify circuit components within the image (e.g., using image recognition, based on data entered by a user, based on data associated with the image, etc.). For example, referencing FIG. 3, the computing system may identify the circuit component 112 as a voltage regulator, the circuit component 114 as a microcontroller, and the circuit component 116 as a crystal oscillator. In some embodiments, the computing system may then associate each of the identified components with a pressure tolerance value. The pressure tolerance value of a component may correspond to the maximum amount of pressure that the component can withstand while still functioning in a predetermined manner. For example, referencing FIG. 3, the circuit component 114 may have a pressure tolerance value of P2, which may be greater than the pressure tolerance value P1 of the circuit component 112, which may be greater than the pressure tolerance value P3 of the circuit component 116. In some embodiments, the computing system may make such associations by accessing and referencing a lookup table that associates known circuit components with pressure tolerance values. The computing system may use this lookup table to determine, for each of the circuit components, a corresponding pressure tolerance value. In other embodiments, the computing system may receive pressure tolerance values for one or more of the circuit components as a manual user input.

The method also includes, based on the determined pressure tolerance values of a first circuit component of the one or more circuit components, increasing a volume of a corresponding first cavity to generate a final three-dimensional model (step 940). As explained above, the sizes of particular cavities may be increased by particular volumes to affect the amount of pressure distributed to the respective circuit components. For example, the volume of a cavity corresponding to a component with a very low pressure tolerance value (e.g., referencing FIG. 3, the circuit component 116) may be increased more as compared to the volume of the cavity corresponding to a component with a higher pressure tolerance value (e.g., referencing FIG. 3, the circuit component 112). This is illustrated by the example enclosure 200 in FIG. 2A. In some embodiments, generating the final three-dimensional model includes adding a volume to the initial three-dimensional model directly above the first cavity so as to reduce a risk of collapse under a desired pressure. As discussed above, this volume may be based on gap sizes that would be expected in the enclosure (e.g., at mean sea level pressure) once the enclosure is assembled with the circuit board assembly. In some embodiments, additional material may be added to the final model in areas above the expected gaps, such that the height of the pressure distribution structure varies across the circuit board assembly. In other embodiments, the height of the pressure distribution structure may be set by the largest gap and may remain constant across the circuit board assembly.

The method further includes sending the final three-dimensional model to a fabrication system (step 950). For example, an appropriate data file may be sent to a computer numerical control (CNC) router system, a milling machine, a 3D printer, or any other suitable system. The fabrication system may create one or more pressure distribution structures based on the final three-dimensional model.

Once the enclosure structure has been manufactured, a circuit board assembly enclosure may be assembled. This may include positioning the pressure distribution structures appropriately with respect to the circuit board assembly and securing the pressure distribution structures (e.g., using an adhesive, screws, bolts, O-rings, and/or any other suitable mechanism) to create a pressure-distributed assembly. Finally, an envelope may be placed around the pressure-distributed assembly. For example, the envelope may be a polymer enclosure, a mylar bag, or any other suitable envelope. Such an envelope may be used to vacuum seal the pressure-distributed assembly. As another example, the pressure-distributed assembly may be first wrapped in a sealing layer (e.g., duct tape), and may then be surrounded by the polymer enclosure.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for manufacturing a custom enclosure structure for distributing pressure in a predetermined manner across a circuit board assembly, including the particular steps of the method of FIG. 9, this disclosure contemplates any suitable method for manufacturing a custom enclosure structure for distributing pressure in a predetermined manner across a circuit board assembly, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9. Finally, although the steps of the method of FIG. 9 are listed as distinct steps, the disclosure contemplates that any of the steps may be performed in combination (e.g., simultaneously and concurrently). For example, step 920 and step 940 may occur simultaneously and concurrently such that the initial three-dimensional model is finalized (e.g., by increasing cavity volumes based on pressure tolerances) as it is being created, and not as two discrete and separate steps.

Figure 10:
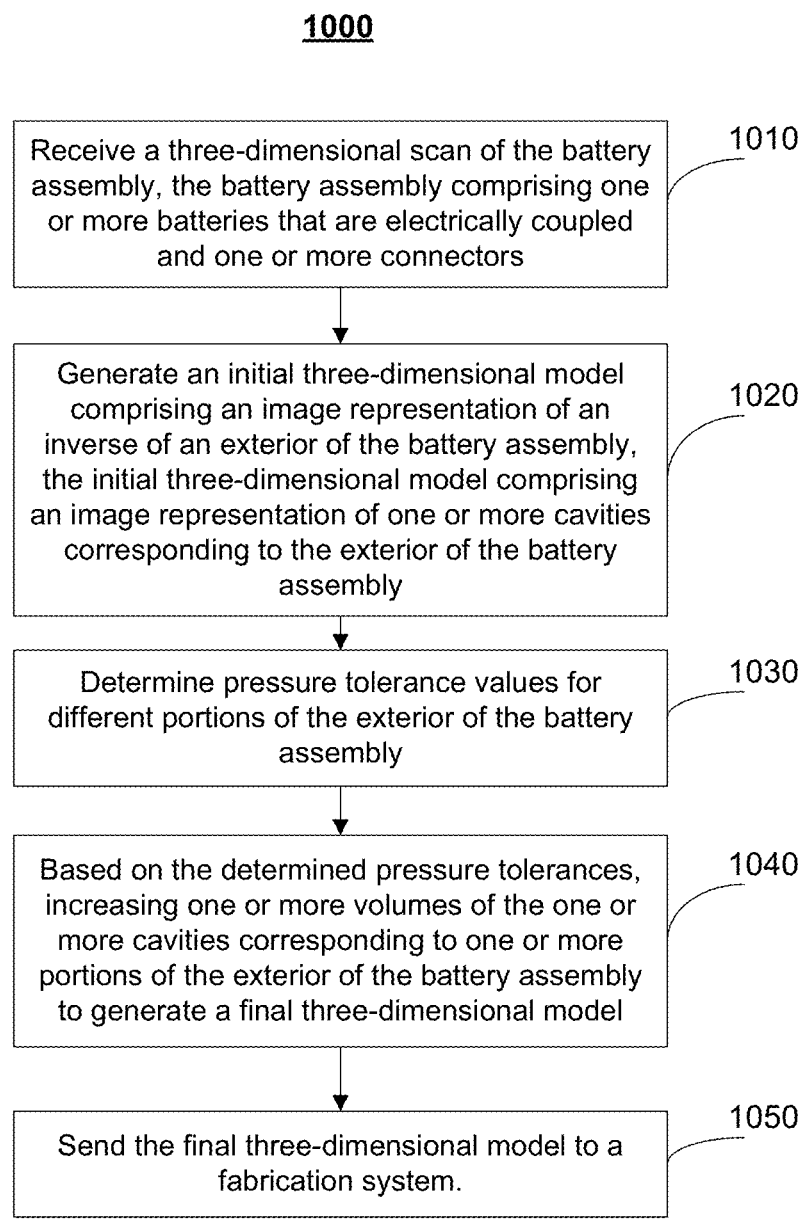
FIG. 10 illustrates an example method for manufacturing a custom enclosure structure for distributing pressure across a battery assembly according to an embodiment of the present invention.

The enclosures described herein may be designed and manufactured in any suitable manner. FIG. 10 illustrates an example method 1000 for manufacturing a custom enclosure structure for distributing pressure across a battery assembly according to an embodiment of the present invention. The method includes receiving a three-dimensional scan of the battery assembly, the battery assembly including one or more batteries that are electrically coupled and one or more connectors (step 1010). The three-dimensional scan may be an image representation of the battery assembly.

The method further includes generating an initial three-dimensional model including an image representation of an inverse of an exterior of the battery assembly (step 1020). The initial three-dimensional model may include an image representation of one or more cavities corresponding to the exterior of the battery assembly.

The method further includes determining pressure tolerance values for different portions of the exterior of the battery assembly (step 1030). As described above, particular portions of the battery (e.g., the ends of the battery) may have a higher pressure tolerance than other portions (e.g., the middle of the battery).

The method further includes, based on the determined pressure tolerances, increasing one or more volumes of the one or more cavities corresponding to one or more portions of the exterior of the battery assembly to generate a final three-dimensional model (step 1040). For example, the final three-dimensional model may have an image representation of a cavity shaped such that a portion of the three-dimensional model corresponding to the middle of a battery produces a larger gap when assembled than a portion of the three-dimensional model corresponding to an end of the battery. An example of this is illustrated in FIGS. 8A-8C and 8E.

The method further includes sending the final three-dimensional model to a fabrication system to create a pressure distribution structure, similar to process 950 of the method 900 (step 1050). Once the enclosure has been manufactured, a battery assembly enclosure may be assembled (in a manner similar to what has been described with respect to the method 900).

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for manufacturing a custom enclosure structure for distributing pressure in a predetermined manner across a battery assembly, including the particular steps of the method of FIG. 10, this disclosure contemplates any suitable method for manufacturing a custom enclosure structure for distributing pressure in a predetermined manner across a battery assembly, including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10. Finally, although the steps of the method of FIG. 10 are listed as distinct steps, the disclosure contemplates that any of the steps may be performed in combination (e.g., simultaneously and concurrently). For example, step 1020 and step 1040 may occur simultaneously and concurrently such that the initial three-dimensional model is finalized (e.g., by increasing cavity volumes based on pressure tolerances) as it is being created, and not as two discrete and separate steps.

Figure 11A:
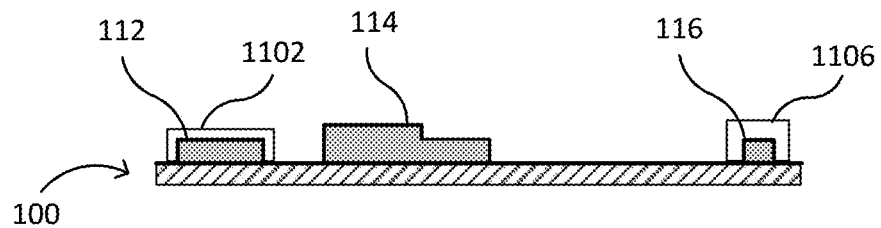
FIG. 11A illustrates a simplified, cross-sectional schematic diagram of a circuit board assembly with volume-increasing elements positioned over circuit components to aid with manufacturing of a custom pressure distribution structure for the circuit board assembly.

FIG. 11A illustrates a simplified, cross-sectional schematic diagram of a circuit board assembly 100 with a first volume-increasing element 1102 and a second volume-increasing element 1106 positioned over circuit components to aid with manufacturing of a custom pressure distribution structure for the circuit board assembly 100. In some embodiments, pressure distribution structures may be created without requiring the creation of 3D models. In some embodiments, one or more volume-increasing elements may be positioned over circuit components that require cavities in the pressure distribution structure. These volume-increasing elements may be made of any suitable materials (e.g., plastic, metal, a polymer composite). As will be explained below, these volume-increasing elements may be temporarily positioned over the circuit components that require cavities to determine a desired size of cavities that are to be formed in the pressure distribution structure around the components. The thickness of the volume-increasing elements may be based on the pressure tolerances of the circuit components. For example, referencing FIG. 11A, a first volume-increasing element 1102 may be positioned over the circuit component 112 and a second volume-increasing element 1106 may be placed over the circuit component 116. In this example, the circuit component 116 has a lower pressure tolerance than the circuit component 112. As illustrated in FIG. 11A, the thickness of the second volume-increasing element 1106 is greater than the thickness of the first volume-increasing element 1102, which will ultimately result in a larger cavity around the circuit component 116 than around the circuit component 112, as will be explained below. Components that do not require any cavities in the pressure distribution structure (e.g., the circuit component 114 in FIG. 11A) may not have any volume-increasing components disposed thereon.

Figure 11B:
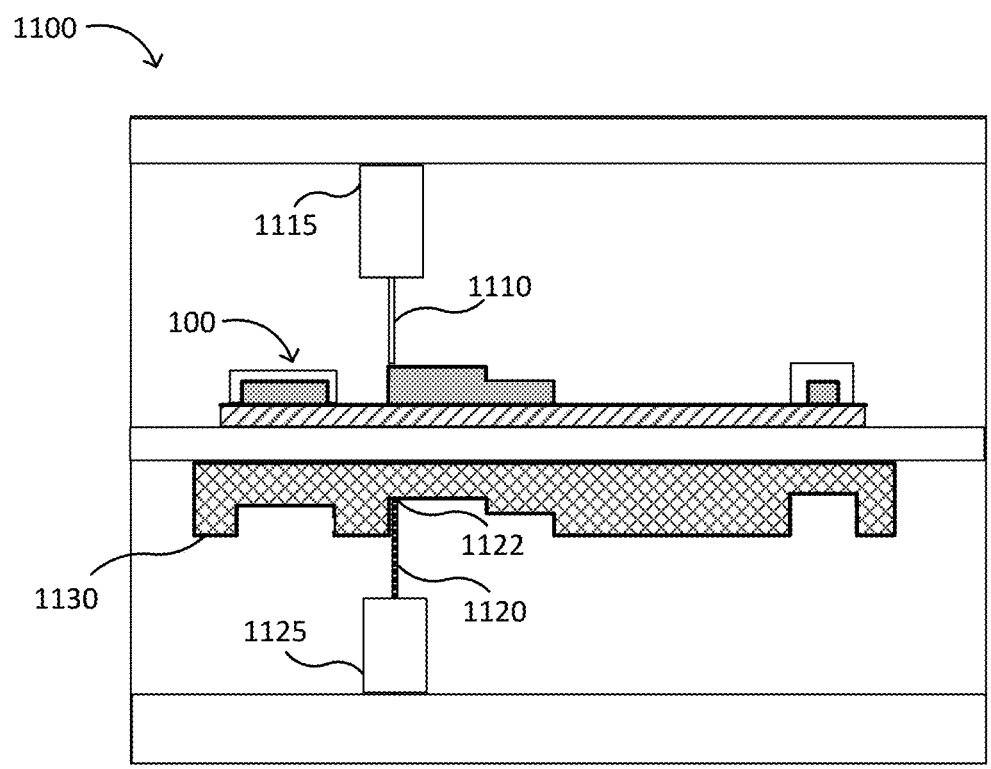
FIG. 11B illustrates a simplified, cross-sectional schematic diagram of a system for manufacturing a pressure distribution structure for a circuit board assembly 100 using a probe-and-router system.

FIG. 11B illustrates a simplified, cross-sectional schematic diagram of a system for manufacturing a pressure distribution structure for a circuit board assembly 100 using a probe-and-router system 1100. In some embodiments, the circuit board assembly 100 (with any volume-increasing elements positioned as described above) may be disposed within a probe-and-router system 1100. The probe-and-router system 1100 may include a probe 1110 coupled to an actuator 1115. The actuator 1115 may be configured to actuate the probe 1110 across a first side of the circuit board assembly 100 (e.g., referencing FIG. 11B, the top side that is exposed to the probe 1110). The probe 1110 may be actuated along a first plane that is parallel to the first side of the circuit board assembly 100. The probe 1110 may be configured to move perpendicularly with respect to the first plane. For example, referencing FIG. 11B, the probe 1110 may be configured to move up and down. These perpendicular movements may be based on a height of the first side of the circuit board assembly proximate to a distal end 1110a of the probe 1110. For example, referencing FIG. 11B, the probe 1110 may move up or down as it is actuated across the first side of the circuit board assembly 100 to conform to the height of the circuit components and/or the volume-increasing elements positioned on the circuit components.

As the probe 1110 is actuated across the circuit board assembly 100, a router element 1120 may be actuated by an actuator 1125 across a corresponding first side of a pressure distribution article 1130. The router element 1120 may include a cutting surface at the distal end 1122 that is configured to cut the pressure distribution article 1130. For example, the router element 1120 may be a rotating bit or lathe with sharp edges or contours for cutting into the pressure distribution article 1130. The router element 1120 may follow the lead of the probe 1110, such that the location of the point of contact between the distal end 1122 and the pressure distribution article 1130 corresponds to the location of the probe 1110 proximate to the circuit board assembly. The router element 1120 may be actuated along a second plane that is parallel to the first side of the pressure distribution structure (in some embodiments, this second plane may be parallel to the first plane of the circuit board assembly 100, as illustrated in FIG. 11B). The router element 1120 may be configured to move perpendicularly with respect to the second plane in accordance with the perpendicular movements of the probe. For example, the router element 1120 may move up or down to match the movements of the probe 1110 (which depends on the heights of the first side of the circuit board assembly, as discussed above). As the router element 1120 is actuated across the first side of the pressure distribution article 1130, the distal end 1122 cuts into the first side of the pressure distribution article such that its position (as determined by the position of the probe 1110) creates cavities in the pressure distribution article suitable for receiving circuit components of the circuit board assembly 100. In some embodiments, the probe 1110 and the router element 1120 may be mechanically coupled such that the router element moves along with the probe by mechanical means. In other embodiments, the probe 1110 and the router element 1120 may not be mechanically coupled. In these embodiments, position information of the probe 1110 indicating positions of the probe 1110 (both along the first plane and perpendicular to the first plane) as it moves across the first side of the circuit board assembly 100 may be recorded in a memory. This position information may be accessed and used to independently move the router element 1120 as it moves across the first side of the pressure distribution article. Once the probe 1110 has been actuated across the entirety of the circuit board assembly 100 (and when the router element 1120 has correspondingly been actuated across corresponding points on the pressure distribution article 1130), the result is a pressure distribution structure that can be positioned, as described elsewhere herein, over the first side of the circuit board assembly (after removing the volume-increasing elements).

Although FIGS. 11A-11B illustrate a single probe 1110 and a single router element 1120, the disclosure contemplates that any number of probes and router elements may be used. For example, two probes and two router elements may be used in tandem, with each probe corresponding to a router element. Having more than one probe and router may speed up the manufacturing process.

Figure 12:
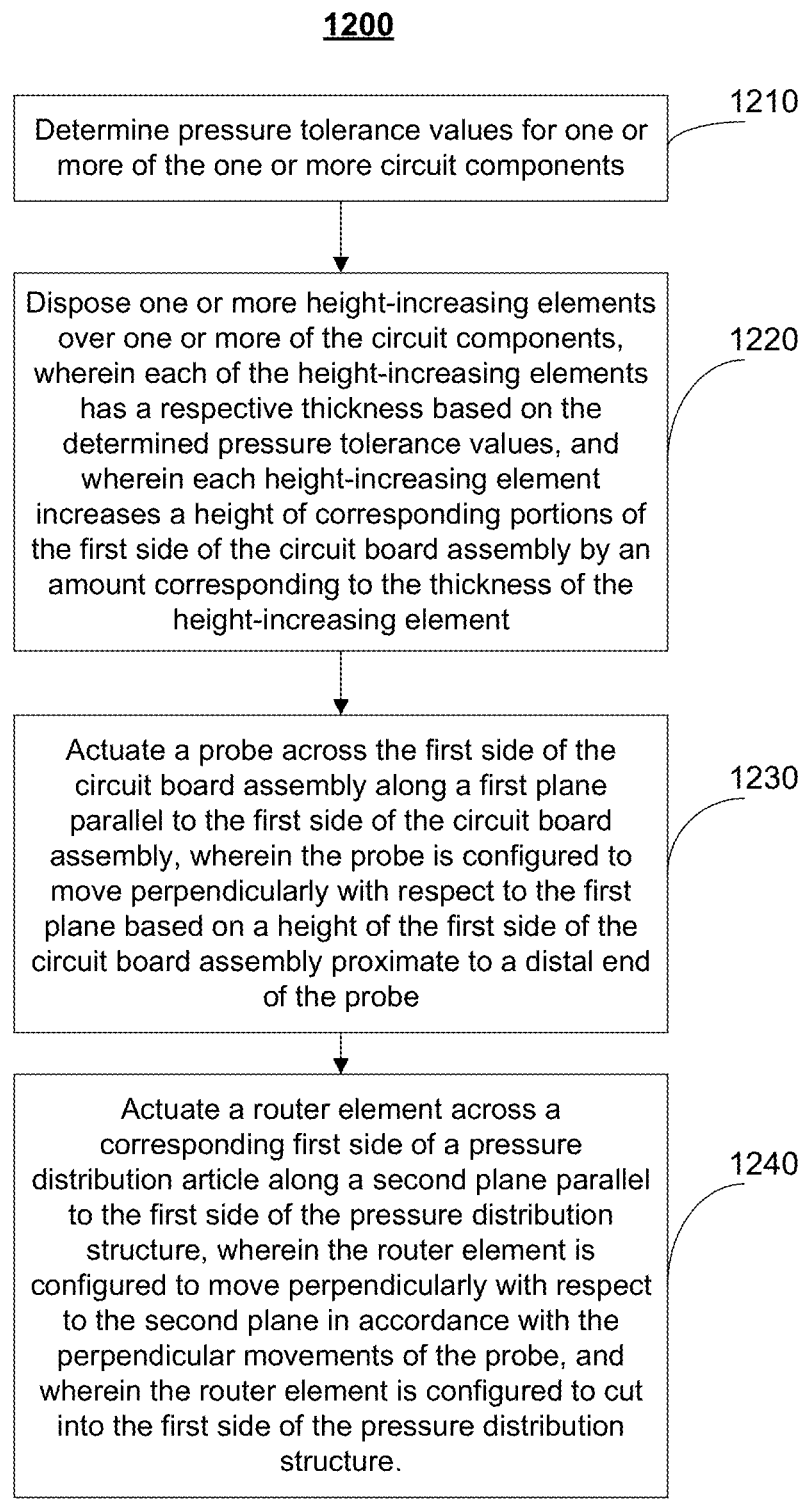
FIG. 12 illustrates an example method for manufacturing a custom pressure distribution structure for distributing pressure in a predetermined manner across a first side of a circuit board assembly including one or more circuit components mounted on a first surface of the circuit board assembly.

FIG. 12 illustrates an example method 1200 for manufacturing a custom pressure distribution structure for distributing pressure in a predetermined manner across a first side of a circuit board assembly including one or more circuit components mounted on a first surface of the circuit board assembly. This method may make use of the router system 1100 illustrated in FIGS. 11A-11B. The method includes determining pressure tolerance values for one or more of the one or more circuit components (step 1210). The method further includes disposing one or more volume-increasing elements over one or more of the circuit components, wherein each of the volume-increasing elements has a respective thickness based on the determined pressure tolerance values, and wherein each volume-increasing element increases a height of corresponding portions of the first side of the circuit board assembly by an amount corresponding to the thickness of the volume-increasing element (step 1220). The method further includes actuating a probe across the first side of the circuit board assembly along a first plane parallel to the first side of the circuit board assembly, wherein the probe is configured to move perpendicularly with respect to the first plane based on a height of the first side of the circuit board assembly proximate to a distal end of the probe (step 1230). The method further includes actuating a router element across a corresponding first side of a pressure distribution article along a second plane parallel to the first side of the pressure distribution article, wherein the router element is configured to move perpendicularly with respect to the second plane in accordance with the perpendicular movements of the probe, and wherein the router element is configured to cut into the first side of the pressure distribution article (step 1240). Once the pressure distribution article is completed, it may be positioned over the first side of the circuit board assembly as described elsewhere herein to form at least part of an enclosure for distributing pressure across the circuit board assembly and thereby protecting the circuit board assembly.

Although FIGS. 11A-11B and 12 and the associated description focus on the manufacturing of a pressure distribution structure for a circuit board assembly, the disclosure contemplates that a similar system and method may be used to manufacture pressure distribution structures for any suitable component. For example, a pressure distribution structure for a battery assembly such as those illustrated in FIGS. 8A-8E may be manufactured (e.g., by wrapping a volume-increasing material around a battery and creating a pressure distribution structure within the probe-and-router system 1100).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A circuit board assembly enclosure for providing a predetermined pressure distribution, the circuit board assembly enclosure comprising:
   a circuit board assembly comprising a circuit board having a first surface and a second surface, the circuit board assembly comprising one or more circuit components mounted on the first surface; and
   a first pressure distribution structure positioned over the circuit board assembly, wherein the first pressure distribution structure comprises:
      one or more areas conforming to and in contact with one or more corresponding sections of the first surface, and
      one or more cavities, each cavity configured to receive one of the one or more circuit components, the one or more cavities comprising a first cavity having a first volume larger than a volume of a corresponding first circuit component of the one or more circuit components so as to create a first gap between the first pressure distribution structure and the first circuit component when the enclosure is at sea level,
   wherein the circuit board assembly enclosure is configured to withstand pressures of at least 7,000 psi.

2. The enclosure of claim 1 wherein the one or more cavities further comprise a second cavity, and wherein the one or more circuit components further comprises a corresponding second circuit component, the second cavity having a second volume that is approximately the same as a volume of the corresponding second circuit component.

3. The enclosure of claim 2 wherein the one or more cavities further comprise a third cavity, and wherein the one or more circuit components further comprises a corresponding third circuit component, the third cavity having a third volume larger than a volume of a corresponding third circuit component so as to create a third gap between the first pressure distribution structure and the third circuit component,
   wherein a distance between the first pressure distribution structure and the third circuit component across the third gap is larger than a distance between the first pressure distribution structure and the first circuit component across the first gap such that the first circuit component is exposed to more pressure than the third circuit component when the enclosure is exposed to a high-pressure environment at a particular pressure level above a threshold.

4. The enclosure of claim 1 wherein the second surface comprises one or more second-surface circuit components, the enclosure further comprising a second pressure distribution structure having one or more cavities corresponding to the one or more second-surface circuit components.

5. The enclosure of claim 4 further comprising:
an additional circuit board assembly having one or more additional circuit components mounted on a surface of the additional circuit board assembly; and
an additional pressure distribution structure having one or more cavities corresponding to the one or more additional circuit components.

6. The enclosure of claim 4 wherein the first pressure distribution structure and the second pressure distribution structure form a single integral structure.

7. The enclosure of claim 1 further comprising a pressure distributing layer disposed within the first gap, wherein the pressure distributing layer comprises a polymer material.

8. The enclosure of claim 7 wherein the pressure distributing layer is disposed over a top surface of the first circuit component.

9. The enclosure of claim 1 further comprising an envelope surrounding the circuit board assembly and the first pressure distribution structure.

10. The enclosure of claim 9, wherein further comprising a sealing layer comprising a fabric material, wherein the envelope overlays the sealing layer.

11. The enclosure of claim 10 wherein the sealing layer comprises an adhesive tape comprising a woven fabric.

12. The enclosure of claim 1 further comprising:
a first thermally conductive layer coupled to the first surface or the second surface, wherein the first thermally conductive layer is configured to receive heat from the circuit board assembly;
a second thermally conductive layer coupled to an outer surface of the first pressure distribution structure; and
a via disposed in between the first thermally conductive layer and the second thermally conductive layer, wherein the via is configured to conduct heat from the first thermally conductive layer to the second thermally conductive layer.

13. An enclosure structure for distributing pressure in a predetermined manner across a circuit board assembly, the enclosure structure comprising:
a first pressure distribution structure configured to be positioned over the circuit board assembly, wherein the first pressure distribution structure comprises:
one or more areas configured to conform to and contact with one or more corresponding sections of a first surface of the circuit board assembly, and
one or more cavities, each cavity configured to receive one or more circuit components of the circuit board assembly, the one or more cavities comprising a first cavity having a first volume larger than a volume of a corresponding first circuit component of the one or more circuit components so as to create a first gap between the first pressure distribution structure and the first circuit component,
wherein the enclosure structure is configured to withstand pressures of at least 7,000 psi.

* * * * *